United States Patent
Jascomb

(10) Patent No.: US 11,576,449 B2
(45) Date of Patent: Feb. 14, 2023

(54) DISPOSABLE SURGICAL GOWN

(71) Applicant: O&M Halyard, Inc., Mechanicsville, VA (US)

(72) Inventor: Jerald T. Jascomb, Roswell, GA (US)

(73) Assignee: O&M Halyard, Inc., Mechanicsville, VA (US)

(*) Notice: Subject to any disclaimer, the term of this patent is extended or adjusted under 35 U.S.C. 154(b) by 634 days.

(21) Appl. No.: 16/681,925

(22) Filed: Nov. 13, 2019

(65) Prior Publication Data

US 2020/0077722 A1  Mar. 12, 2020

Related U.S. Application Data

(63) Continuation of application No. 15/737,522, filed as application No. PCT/US2017/030736 on May 3, 2017, now Pat. No. 10,512,289.

(Continued)

(51) Int. Cl.
*B32B 5/02* (2006.01)
*B32B 5/26* (2006.01)
(Continued)

(52) U.S. Cl.
CPC ....... *A41D 13/1227* (2013.01); *A41D 31/102* (2019.02); *B32B 5/022* (2013.01);
(Continued)

(58) Field of Classification Search
CPC ........... B32B 5/269; B32B 5/022; B32B 5/26; B32B 27/12; B32B 27/20;
(Continued)

(56) References Cited

U.S. PATENT DOCUMENTS 2,668,294 A  2/1954  Gilpin
3,259,913 A  7/1966  Tames
(Continued)

FOREIGN PATENT DOCUMENTS

CN  1242786 A  1/2000
CN  102504422 A  6/2012
(Continued)

OTHER PUBLICATIONS

Kimberly-Clark Corporation, "Aero Blue", 510K Summary, May 8, 2014, 9 pages.

(Continued)

*Primary Examiner* — Joanna Pleszczynska
(74) *Attorney, Agent, or Firm* — Dority & Manning, P.A.

(57) ABSTRACT

A disposable surgical gown is provided. The gown includes a front panel and sleeves formed from a first spunbond layer, a nonwoven (e.g., SMS) laminate, and a liquid impervious, moisture vapor breathable elastic film disposed therebetween. The gown also includes a first and second rear panels formed from a nonwoven laminate that is air breathable and allows for an air volumetric flow rate ranging from about 20 standard cubic feet per minute (scfm) to about 80 scfm. The gown further includes a collar formed from an air breathable knit material positioned adjacent a proximal end of the gown. The collar defines a neck opening having a v-neck shape adjacent the front panel. The v-neck shape forms an angle of greater than 90° at the neck opening. The combination of features results in a reduced-glare gown that is stretchable and impervious to liquids, yet can still dissipate heat and humidity.

12 Claims, 4 Drawing Sheets

Related U.S. Application Data

(60) Provisional application No. 62/331,641, filed on May 4, 2016.

(51) Int. Cl.
*B32B 27/12* (2006.01)
*B32B 27/20* (2006.01)
*A41D 13/12* (2006.01)
*A41D 31/102* (2019.01)
*D04H 3/007* (2012.01)

(52) U.S. Cl.
CPC ............... *B32B 5/26* (2013.01); *B32B 5/269* (2021.05); *B32B 27/12* (2013.01); *B32B 27/20* (2013.01); *D04H 3/007* (2013.01); *A41D 2400/52* (2013.01); *A41D 2500/30* (2013.01); *A41D 2600/20* (2013.01); *B32B 2307/724* (2013.01); *B32B 2307/7265* (2013.01); *B32B 2535/00* (2013.01); *D10B 2321/021* (2013.01); *D10B 2321/022* (2013.01); *D10B 2509/00* (2013.01)

(58) Field of Classification Search
CPC .............. B32B 2307/724; A41D 13/12; A41D 13/1227; A41D 13/1209
See application file for complete search history.

(56) References Cited

U.S. PATENT DOCUMENTS

| | | |
|---|---|---|
| 3,359,569 A | 12/1967 | Rotanz et al. |
| 3,696,443 A | 10/1972 | Taylor |
| 3,754,284 A | 8/1973 | Hartigan et al. |
| 3,790,964 A | 2/1974 | Hartigan |
| 3,864,757 A | 2/1975 | Hartigan |
| 3,868,728 A | 3/1975 | Krzewinski |
| 3,921,221 A | 11/1975 | Zoephel |
| 3,935,596 A | 2/1976 | Allen, Jr. et al. |
| 4,017,909 A | 4/1977 | Brandriff |
| 4,054,952 A | 10/1977 | Swallow |
| 4,106,120 A | 8/1978 | Zurbrigg et al. |
| 4,395,782 A | 8/1983 | Reynolds |
| 4,408,357 A | 10/1983 | Toth |
| 4,535,481 A | 8/1985 | Ruth-Larson et al. |
| 4,558,468 A | 12/1985 | Landry et al. |
| 4,674,132 A | 6/1987 | Stein et al. |
| 4,823,404 A | 4/1989 | Morell et al. |
| 4,843,641 A | 7/1989 | Cusick et al. |
| 4,845,779 A | 7/1989 | Wheeler et al. |
| 4,978,719 A | 12/1990 | Wong |
| 4,978,721 A | 12/1990 | Wong |
| 4,988,770 A | 1/1991 | Wong |
| 5,005,216 A | 4/1991 | Blackburn et al. |
| 5,015,695 A | 5/1991 | Wong |
| 5,027,438 A | 7/1991 | Scbwarze et al. |
| 5,083,315 A | 1/1992 | Dillon, Jr. |
| 5,331,683 A | 7/1994 | Stone et al. |
| 5,386,595 A | 2/1995 | Kuen et al. |
| 5,403,302 A | 4/1995 | Roessieretak |
| 5,447,792 A | 9/1995 | Brandt et al. |
| 5,461,724 A | 10/1995 | Wiedner et al. |
| 5,539,072 A * | 7/1996 | Wu .................... B01D 39/083 428/339 |
| 5,652,051 A * | 7/1997 | Shawver .................. D01F 6/30 442/364 |
| 5,813,052 A | 9/1998 | Taylor |
| 6,049,907 A | 4/2000 | Palomo |
| 6,332,221 B1 | 12/2001 | Gracey |
| 6,460,187 B1 | 10/2002 | Siegel |
| 6,851,125 B2 | 2/2005 | Fujikawa et al. |
| 6,954,946 B2 | 10/2005 | Goldfarb et al. |
| 7,048,818 B2 | 5/2006 | Krantz et al. |
| D565,279 S | 4/2008 | Farrell |
| 7,424,750 B2 | 9/2008 | Kerr |
| 7,491,196 B2 | 2/2009 | Franke et al. |
| 7,549,179 B1 | 6/2009 | Saied |
| 7,725,992 B2 | 6/2010 | Efremova et al. |
| 7,785,309 B2 | 8/2010 | Van Gompel et al. |
| 7,802,313 B2 | 9/2010 | Czajka |
| D646,463 S | 10/2011 | Petrovskis et al. |
| 8,101,534 B2 | 1/2012 | Dharmarajan et al. |
| 8,206,366 B2 | 6/2012 | Datta et al. |
| 8,332,965 B1 | 12/2012 | Ryer |
| 8,721,827 B2 | 5/2014 | Chang et al. |
| 8,726,414 B2 | 5/2014 | Baron et al. |
| 8,990,966 B2 | 3/2015 | Von Furstenberg et al. |
| D741,569 S | 10/2015 | Fredrickson |
| 9,224,508 B2 | 12/2015 | Reynolds |
| 10,271,916 B2 | 4/2019 | Allen |
| 2002/0142692 A1 | 10/2002 | Ferencz |
| 2003/0126668 A1 | 7/2003 | Scroggins |
| 2003/0157859 A1 | 8/2003 | Ishikawa |
| 2004/0006815 A1 | 1/2004 | Carroll et al. |
| 2005/0079372 A1 | 4/2005 | Schmal et al. |
| 2005/0132463 A1 | 6/2005 | Kathumbi-Jackson et al. |
| 2005/0132465 A1 | 6/2005 | Kathumbi-Jackson et al. |
| 2006/0096003 A1 | 5/2006 | Plaatje et al. |
| 2006/0160453 A1 | 7/2006 | Suh |
| 2006/0251858 A1 | 11/2006 | Thomas et al. |
| 2008/0108268 A1 * | 5/2008 | Little .................... B32B 27/308 428/323 |
| 2008/0155728 A1 | 7/2008 | Hafer et al. |
| 2008/0268190 A1 | 10/2008 | Shi et al. |
| 2008/0271228 A1 | 11/2008 | Plaatje et al. |
| 2009/0068912 A1 | 3/2009 | Boscolo et al. |
| 2009/0165186 A1 | 7/2009 | Mijares et al. |
| 2009/0286906 A1 | 11/2009 | Shi et al. |
| 2011/0003524 A1 | 1/2011 | Claasen et al. |
| 2011/0024485 A1 | 2/2011 | Porowski |
| 2012/0016728 A1 | 1/2012 | Moula-Muliman |
| 2012/0045956 A1 | 2/2012 | Tau et al. |
| 2012/0054940 A1 | 3/2012 | Halseth |
| 2012/0233737 A1 | 9/2012 | Slot |
| 2012/0328841 A1 * | 12/2012 | Afshari .................. B29C 48/395 428/172 |
| 2012/0329354 A1 | 12/2012 | Afshari |
| 2012/0330258 A1 | 12/2012 | Poruthoor |
| 2013/0086775 A1 | 4/2013 | Raymond |
| 2013/0165008 A1 * | 6/2013 | Gallez .................. D04H 1/4291 428/401 |
| 2013/0305426 A1 | 11/2013 | Walrich |
| 2013/0318693 A1 | 12/2013 | McBride et al. |
| 2014/0082823 A1 | 3/2014 | Gordon et al. |
| 2014/0127461 A1 | 5/2014 | Xu et al. |
| 2014/0155864 A1 | 6/2014 | Andréen |
| 2014/0189931 A1 | 7/2014 | Fredrickson |
| 2015/0059390 A1 | 3/2015 | Hayes |
| 2015/0150316 A1 | 6/2015 | Champagne et al. |
| 2015/0150318 A1 | 6/2015 | Terrell |
| 2015/0210038 A1 | 7/2015 | Ichikawa et al. |
| 2015/0233031 A1 | 8/2015 | Kunimoto et al. |
| 2016/0128391 A1 | 5/2016 | Moore |
| 2019/0150534 A1 | 5/2019 | Jascomb |

FOREIGN PATENT DOCUMENTS

| | | |
|---|---|---|
| CN | 203789203 U | 8/2014 |
| CN | 104968848 A | 10/2015 |
| DE | 29703238 U1 | 4/1997 |
| DE | 202007012469 U1 | 3/2008 |
| EP | 1 228 712 B1 | 9/2005 |
| GB | 1 492 553 | 11/1977 |
| JP | 3000829 U | 8/1994 |
| JP | 2002235223 A | 8/2002 |
| JP | 2005036369 A | 2/2005 |
| JP | 2007092258 A | 4/2007 |
| KR | 20050001019 A | 1/2005 |
| KR | 101475151 B1 | 12/2014 |
| KR | 101483363 B1 | 1/2015 |
| WO | WO 95/02973 | 2/1995 |
| WO | WO 99/06207 A1 | 2/1999 |
| WO | WO 03/049937 A1 | 6/2003 |
| WO | WO 2005/066406 A1 | 7/2005 |

(56) References Cited

FOREIGN PATENT DOCUMENTS

| WO | WO 2005/120263 A1 | 12/2005 |
|----|-------------------|---------|
| WO | WO 2007/008168 A1 | 1/2007  |
| WO | WO 2007/140163 A2 | 12/2007 |
| WO | WO 2008/026090 A1 | 3/2008  |
| WO | WO 2008/081350 A1 | 7/2008  |
| WO | WO 2014/071787 A1 | 5/2014  |
| WO | WO 2014/199273 A1 | 12/2014 |
| WO | WO 2014/199278 A1 | 12/2014 |
| WO | WO 2015/020741 A1 | 2/2015  |
| WO | WO 2015/075632 A1 | 5/2015  |

OTHER PUBLICATIONS

Kleenguard, http://www.medline.com/product/KLEENGUARD-A40-Breathable-Back-Coveralls-by-Kimberly-Clark/Z05-PF98272, no date given, 2 pages.

MicroMax, http://www.lakeland.com/media/wysiwyg/Disposables/mm_ns_cs_2_11_2015, no date given, 1 page.

TyvekDual, http://www.safespec.dupont.co.uk/safespec/en/product/1060.html?refNm=Recent, 2017, 5 pages.

Mölnlycke Health Care, "Surgical Gown Materials", http://www.molnlycke.com.au/Documents/AUS-NZL/Surgical/Gown_MaterialSheet_PS0511_050_V1_Aus, no date given, 2 pages.

Dymex Healthcare, "Isolation Gown", http://www.dymexhealthcare.com/Products/Isolation-Gown/142907012054469.html, no date given, 2 pages.

Dymex Healthcare, "Coverall", http://dymexhealtcare.com/Products/Coverall/143149496469203.html, no date given, 2 pages.

Encompas, "Personal Protective Equipment Catalog", http://www.encompassgroup.net/content/pdf/Encompass_PPE_Catalog, 2011, 28 pages.

Amaryllis Healthcare, "Surgical Gowns", http://www.amaryllishealthcare.in/surgical-gowns.html, no date given, 3 pages.

Jingzhou Haixin Green Cross Medical Products Catalog, online, http://hh-greencross.en.alibaba.com, no date given.

Medline Textiles, "Medline Catalog", https://cdn.shopify.com/s/files/1/0380/0221/files/Medline_Textile_Patient_Apparel.pdf, no date given, 32 pages.

Tidi Products "Tidi Products Catalog", http://www.tidiproducts.com/wp-content/uploads/2014/12/Medical-Catalog-Winter-2014.pdf, no date given, 48 pages.

Chang et al., "Electro-Optical Light Management Material: Low Refractive Index Pressure Sensitive Adhesives", no date given, 14 pages.

A.P. Kharitonov, "Practical applications of the direct flurination of polymers", Journal of Fluorine Chemistry, vol. 103, Russia, 2000, pp. 123-127.

International Search Report and Written Opinion for PCT/US2017/030736, dated Sep. 18, 2017, 17 pages.

\* cited by examiner

DISPOSABLE SURGICAL GOWN

RELATED APPLICATION

The present application is a continuation of U.S. application Ser. No. 15/737,522, filed Dec. 18, 2017, which is the national stage entry of International Patent Application No. PCT/US2017/030736 having a filing date of May 3, 2017, which claims priority to U.S. Provisional Application Ser. No. 62/331,641, having a filing date of May 4, 2016, the entire contents of which are incorporated by reference.

FIELD OF THE INVENTION

The present invention relates to protective garments such as surgical gowns worn by medical care providers in the operating room or people in any other environment where exposure to hazardous materials and liquids is a risk.

BACKGROUND OF THE INVENTION

Surgeons and other healthcare providers often wear an over garment during operating procedures in order to enhance the sterile condition in the operating room and to protect the wearer. The over garment is typically a gown that has a main body portion to which sleeves and a tie cord or other securing means are attached. The tie cord encircles the wearer at the waist to keep the gown in place. In order to prevent the spread of infection to and from the patient, the surgical gown prevents bodily fluids and other liquids present during surgical procedures from flowing through the gown.

Surgical gowns were originally made of cotton or linen, were reusable, and were sterilized prior to each use in the operating room. A disadvantage of the materials used in these types of gowns is that they tend to form lint, which is capable of becoming airborne or clinging to the clothes of the wearer, thereby providing another potential source of contamination. Additionally, costly laundering and sterilization procedures were required before reuse.

Disposable surgical gowns have largely replaced the reusable linen surgical gown and many are now made in part or entirely from fluid repellent or impervious fabrics to prevent liquid penetration or "strike through." Various materials and designs have been used in the manufacture of surgical gowns to prevent contamination in different operating room conditions. Surgical gowns are now available in a variety of different levels of imperviousness and comfort. Such gowns can typically be secured with tie cords. However, the tie cords can be cumbersome to tie and adjust to the appropriate level of comfort for each particular user and often loosen or become untied, resulting in a gown that is not maintained securely, which can put the wearer at risk for exposure to bodily fluids and other potentially hazardous materials and liquids. In addition, while other fastening means such as hook and loop materials can be used in conjunction with or in place of tie cords, other personal protective equipment such as a bouffant can become caught in the hook and loop materials based on their placement, which can be very irritating to the wearer. Moreover, in order to ensure that no blood, bone fragments, or other biologic materials or body fluids come into contact with the wearer, the collar of many surgical garments can be tight, restrictive, and uncomfortable to the wearer.

Further, gowns made from an impervious material provide a high degree of protection, but a surgical gown constructed of this type of material is typically heavy, restrictive, expensive, and uncomfortably hot to the wearer. While efforts have been made to utilize a lighter weight material in order to provide for better breathability and help reduce the overall weight of the gown, the higher the breathability of the material, the lower the repellency of the material, where the material may not meet the minimum guidelines that have been created for the rating of the imperviousness of surgical gowns, gloves and the like.

Specifically, the Association for the Advancement of Medical Instrumentation (AAMI) has proposed a uniform classification system for gowns and drapes based on their liquid barrier performance. These procedures were adopted by the American National Standards Institute (ANSI) and were recently published as ANSI/AAMI PB70: 2012 entitled Liquid Barrier Performance and Classification of Protective Apparel and Drapes Intended for Use in Health Care Facilities, which was formally recognized by the U.S. Food and Drug Administration in October, 2004. This standard established four levels of barrier protection for surgical gowns and drapes. The requirements for the design and construction of surgical gowns are based on the anticipated location and degree of liquid contact, given the expected conditions of use of the gowns. The highest level of imperviousness is AAMI level 4, used in "critical zones" where exposure to blood or other bodily fluids is most likely and voluminous. The AAMI standards define "critical zones" as the front of the gown (chest), including the tie cord/securing means attachment area, and the sleeves and sleeve seam area up to about 2 inches (5 cm) above the elbow.

In light of the above, a need exists for a surgical garment (e.g., a surgical gown) that meets the AAMI level 4 standard while at the same time being stretchable, soft, breathable, and cool to maximize the comfort for the wearer (e.g., medical care providers). A need also exists for a fastening means that maintains such a garment securely in place during use but is arranged in manner that does not result in other personal protective equipment (e.g., a bouffant) becoming attached or caught in the fastening means. Further, a need exists for a collar that can prevent gapping at the neck opening of the surgical garment, which can put the wearer at risk of exposure to blood, bone fragments, or other biologic materials.

SUMMARY OF THE INVENTION

In accordance with one embodiment of the present invention, a disposable surgical gown is provided. The disposable surgical gown includes a front panel, a first sleeve, and a second sleeve, wherein the front panel, the first sleeve, and the second sleeve each comprise an outer spunbond layer having a surface that defines an outer-facing surface of the front panel, a spunbond-meltblown-spunbond (SMS) laminate having a surface that defines a body-facing surface of the front panel, and a liquid impervious, moisture vapor breathable elastic film disposed therebetween, wherein the elastic film meets the requirements of ASTM-1671; a first rear panel and a second rear panel, wherein the first rear panel and the second rear panel are formed from a nonwoven laminate that is air breathable and allows for an air volumetric flow rate ranging from about 20 standard cubic feet per minute (scfm) to about 80 scfm; and a collar formed from an air breathable knit material and positioned adjacent a proximal end of the gown, wherein the collar defines a neck opening, wherein the collar has a v-neck shape at an area adjacent the front panel, further wherein the v-neck shape forms an angle of greater than 90° at the neck opening.

In one particular embodiment, the elastic film can include a core layer disposed between a first skin layer and a second skin layer. Further, the core layer can include polypropylene and the first skin layer and the second skin layer can each include a copolymer of polypropylene and polyethylene.

In another embodiment, the elastic film can have a basis weight ranging from about 5 gsm to about 50 gsm.

In still another embodiment, the core layer can include a fluorochemical additive. The fluorochemical additive can be present in the core layer in an amount ranging from about 0.1 wt. % to about 5 wt. % based on the total weight of the core layer.

In yet another embodiment, the core layer can include a filler. The filler can be present in the core layer in an amount ranging from about 50 wt. % to about 85 wt. % based on the weight of the core layer.

In one more embodiment, the outer spunbond layer and the SMS laminate can include a semi-crystalline polyolefin. The semi-crystalline polyolefin can include a copolymer of propylene and ethylene, wherein the ethylene is present in an amount ranging from about 1 wt. % to about 20 wt. %.

In an additional embodiment, the outer spunbond layer can have a basis weight ranging from about 5 gsm to about 50 gsm and the SMS laminate can have a basis weight ranging from about 10 gsm to about 60 gsm.

In another embodiment, the outer spunbond layer and the SMS laminate can each include a slip additive. The slip additive can include erucamide, oleamide, stearamide, behenamide, oleyl palmitamide, stearyl erucamide, ethylene bis-oleamide, N,N'-Ethylene Bis(Stearamide) (EBS), or a combination thereof. Further, the slip additive can be present in the outer spunbond layer in an amount ranging from about 0.1 wt. % to about 4 wt. % based on the total weight of the outer spunbond layer, and wherein the slip additive is present in a layer of the SMS laminate in an amount ranging from about 0.25 wt. % to about 6 wt. % based on the total weight of the layer.

In still another embodiment, the first rear panel and the second rear panel can each include a SMS laminate. Further, the first rear panel and the second rear panel can each have a basis weight ranging from 20 gsm to about 80 gsm.

In yet another embodiment, the first rear panel and the second rear panel can include a slip additive. The slip additive can include erucamide, oleamide, stearamide, behenamide, oleyl palmitamide, stearyl erucamide, ethylene bis-oleamide, N,N'-Ethylene Bis(Stearamide) (EBS), or a combination thereof. Further, the slip additive can be present in the first rear panel and the second rear panel in an amount ranging from about 0.25 wt. % to about 6 wt. % based on the total weight of each spunbond layer in the SMS laminate of the first rear panel and the second rear panel.

In one more embodiment, the collar can include a polyester.

In an additional embodiment, the collar can have a first tapered portion adjacent an edge of the first rear panel and a second tapered portion adjacent an edge of the second rear panel.

In another embodiment, the collar can be sewn to the front panel, first sleeve, second sleeve, first rear panel, and second rear panel with a polyester thread.

In still another embodiment, the front panel, the first sleeve, the second sleeve, the first rear panel, the second rear panel, or a combination thereof can be a sufficient shade of gray to reduce glare.

In yet another embodiment, the front panel, the first sleeve, the second sleeve, the first rear panel, the second rear panel, or a combination thereof can include a carbon black pigment and titanium dioxide.

In one more embodiment, the disposable surgical gown can exhibit an opacity of greater than about 98%.

In an additional embodiment, the disposable surgical gown can exhibit a light transmittance of less than about 0.1.

In accordance with another embodiment of the present invention, a laminate material comprising a liquid impervious, moisture vapor breathable elastic film positioned between a first material and a second material is provided. The first material includes a nonwoven layer and the second material includes a spunbond-meltblown-spunbond laminate, wherein the elastic film, first material, and second material each include a carbon black pigment and titanium dioxide, wherein the elastic film further includes a fluorochemical additive, wherein the first material and the second material further include a slip additive, and wherein the laminate material exhibits an opacity of greater than about 98% and a light transmittance of less than about 0.1.

In one particular embodiment, the elastic film can further include a calcium carbonate filler, wherein the calcium carbonate filler is present in a core layer of the elastic film in an amount ranging from about 0.1 wt. % to about 5 wt. % based on the total weight of the core layer.

In an additional embodiment, the fluorochemical additive can be present in a core layer of the elastic film in an amount ranging from about 50 wt. % to about 85 wt. % based on the total weight of the core layer.

In another embodiment, the slip additive can include erucamide, oleamide, stearamide, behenamide, oleyl palmitamide, stearyl erucamide, ethylene bis-oleamide, N,N'-Ethylene Bis(Stearamide) (EBS), or a combination thereof, wherein the slip additive can be present in the first material in an amount ranging from about 0.25 wt. % to about 6 wt. % based on the total weight of the first material, further wherein the slip additive can be present in the second material in an amount ranging from about 0.25 wt. % to about 6 wt. % based on the total weight of each spunbond layer in the second material.

In still another embodiment, the first material can include a spunbond layer. In yet another embodiment, the first material and each spunbond layer in the second material can include a copolymer of propylene and ethylene, wherein the ethylene can be present in an amount ranging from about 1 wt. % to about 20 wt. %.

In one more embodiment, the meltblown layer in the second material can include polypropylene.

In an additional embodiment, the core layer of the elastic film can include propylene.

In another embodiment, the elastic film can include a first skin layer and a second skin layer, wherein the first skin layer and the second skin layer can each include a copolymer of propylene and ethylene, wherein the ethylene can be present in an amount ranging from about 1 wt. % to about 20 wt. %.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE FIGURES

A full and enabling disclosure of the present invention to one skilled in the art, including the best mode thereof, is set forth more particularly in the remainder of the specification, including reference to the accompanying figures, in which.

Figure 1:
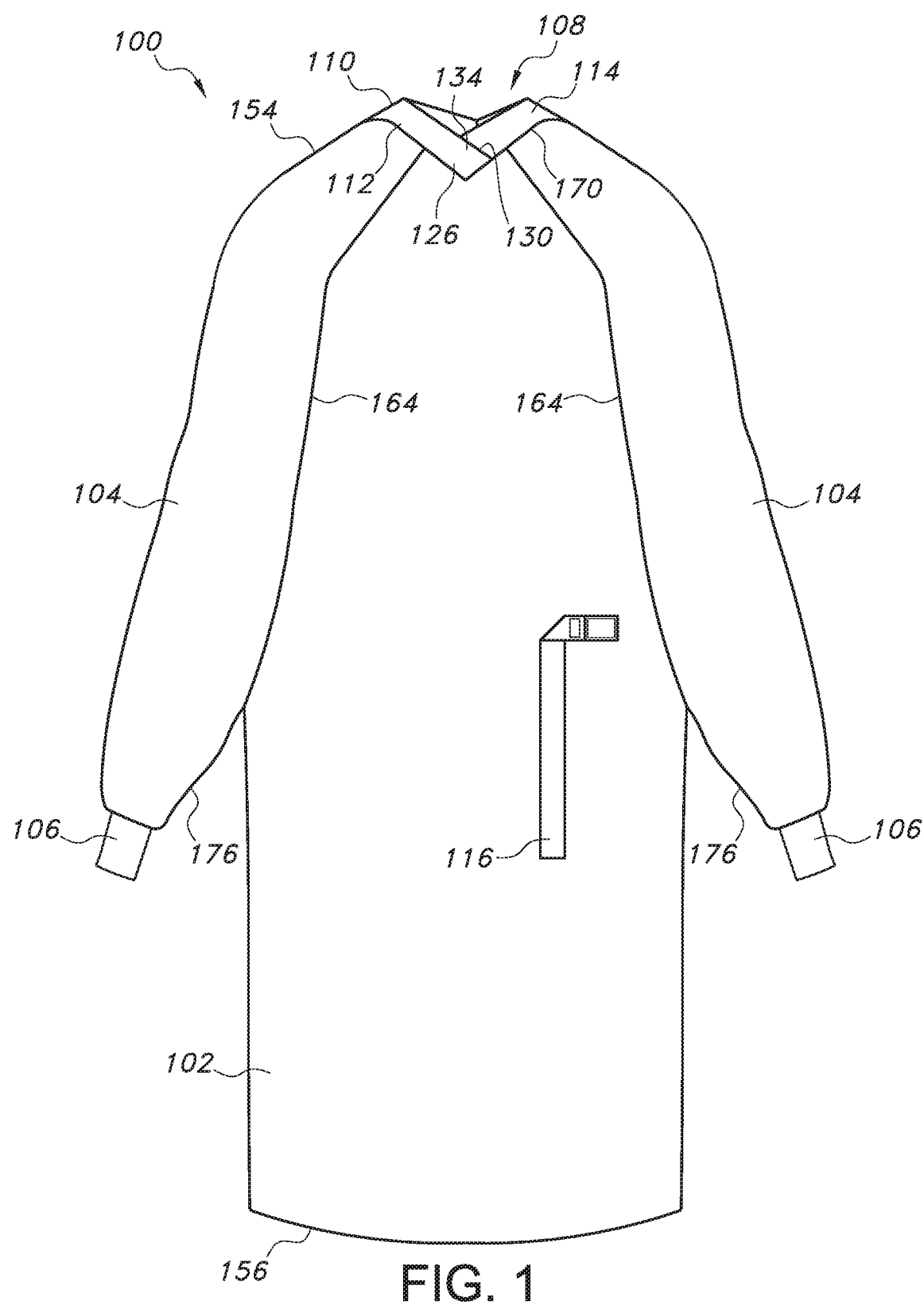
FIG. 1 illustrates a front view of one embodiment of the disposable surgical gown contemplated by the present invention.

Repeat use of reference characters in the present specification and drawings is intended to represent the same or analogous features or elements of the present invention.

Definitions

As used herein, the term "spunbond" refers to fabric made from small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns, more particularly, between about 10 and 20 microns.

As used herein, the term "meltblown" refers to fabric formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. The meltblown fibers are then carried by the high velocity gas stream and are deposited on a collecting surface to form a web of randomly dispersed meltblown fibers. Such a process is disclosed, for example, in U.S. Pat. No. 3,849,241 to Butin et al. Meltblown fibers are microfibers which may be continuous or discontinuous, are generally smaller than 10 microns in average diameter, and are generally tacky when deposited onto a collecting surface.

As used herein, the term "SMS laminate" refers to fabric laminates of spunbond and meltblown fabrics, e.g., spunbond/meltblown/spunbond laminates as disclosed in U.S. Pat. No. 4,041,203 to Brock et al., U.S. Pat. No. 5,169,706 to Collier, et al, U.S. Pat. No. 5,145,727 to Potts et al., U.S. Pat. No. 5,178,931 to Perkins et al. and U.S. Pat. No. 5,188,885 to Timmons et al. Such a laminate may be made by sequentially depositing onto a moving forming belt first a spunbond fabric layer, then a meltblown fabric layer and last another spunbond layer and then bonding the laminate in a manner described below. Alternatively, the fabric layers may be made individually, collected in rolls, and combined in a separate bonding step. Such fabrics usually have a basis weight of from about 0.1 osy to 12 osy (about 3.4 gsm to about 406 gsm), or more particularly from about 0.75 to about 3 osy (about 25.4 gsm to about 101.7 gsm).

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a disposable protective garment (e.g., a surgical gown) that meets the AAMI level 4 critical zone requirements while at the same time being comfortable to the wearer in terms of temperature, stretchability, fit, etc. The gown includes a front panel and sleeves that can be formed from a first material that includes a first spunbond layer, a spunbond-meltblown-spunbond laminate, and a liquid impervious, moisture vapor breathable elastic film disposed therebetween. The gown also includes first and second rear panels formed from a second material that is a nonwoven laminate, where the nonwoven laminate is air breathable and allows for an air volumetric flow rate ranging from about 20 standard cubic feet per minute (scfm) to about 80 scfm. The gown further includes a collar formed from an air breathable knit material positioned adjacent a proximal end of the gown. The collar defines a neck opening having a v-neck shape adjacent the front panel. The v-neck shape of the collar forms an angle of greater than 90° at the neck opening. The combination of features results in a gown that is stretchable and impervious to liquids, yet can still dissipate heat and humidity.

In addition, a specific combination of additives, pigments, and fillers can be included in the various layers of the first and second materials, where the combination of additives, pigments, and fillers increases the opacity (e.g., reduces glare) and reduces the light transmittance of the materials. Without intending to be limited by any particular theory, it is believed that this is due to the combination of high levels of light scattering and light absorption of the materials due to the incorporation of the various additives, pigments, and fillers in one or more layers of the materials, where the different refractive indices of the additives, pigments, and fillers in the various layers of the first and second materials enhance the ability of the materials to attenuate light by absorption and scattering. For instance, the material used to form the disposable surgical gown of the present invention can have an opacity (diffuse reflectance using C-illuminant) greater than about 98%, such as from about 98% to about 99.9%, such as from about 98.5% to about 99.8%, such as from about 99% to about 99.7%. Further, the material used to form the disposable surgical gown of the present invention can have an absorption power of greater than about 0.9, such as from about 0.9 to about 1.2, such as from about 0.95 to about 1.15, such as from about 1 to about 1.1. In addition, the material used to form the disposable surgical gown of the present invention can have a transmittance of less than about 0.1, such as from about 0.05 to about 0.1, such as 0.06 to about 0.095, such as from about 0.07 to about 0.09.

FIG. 1 illustrates a front of a disposable surgical gown 100 that can be worn by medical personnel during a medical examination, surgery, or other procedure. The disposable surgical gown 100 has a proximal end 154 and a distal end 156 that define a front panel 102, where the proximal end 154 includes a collar 110. The gown 100 also includes sleeves 104 and cuffs 106. The front panel 102 and the sleeves 104 can be formed from a laminate of an elastic film and nonwoven materials, as discussed in more detail below. Further, the sleeves 104 can be raglan sleeves, which means that each sleeve 104 extends fully to the collar 110, where a front diagonal seam 164 extends from the underarm up to the collarbone of the wearer and a rear diagonal seam 166 (see FIG. 2) extends from the underarm up to the collarbone of the wearer to attach the sleeves 104 to the front panel 102 and rear panels 120 and 122 of the gown 100. The front diagonal seams 164 and the rear diagonal seams 166 of the sleeves 104 can be sewn to the front panel 102 and rear panels 120 and 122 of the gown. Further, the each sleeve 104 can include a seam 176 that can extend from the underarm area down to the cuff 104, where such sleeves 176 can be seamed thermally so that the sleeves 104 pass ASTM-1671 "Standard Test Method for Resistance of Materials Used in Protective Clothing to Penetration by Blood-Borne Pathogens Using Phi-X174 Bacteriophage Penetration as a Test System." In addition, the collar 110 can be joined to the front panel 102, the sleeves 104, the first rear panel 120 (see FIG. 2), the second rear panel 122 (see FIG. 2) at a seam 170 that is formed by sewing the collar 110 to the aforementioned portions of the surgical gown 110 with a thread (e.g., a polyester thread). Further, a front fastening means 116 can be ultrasonically welded to the front panel 102 and can be used to secure the gown 100 about a wearer when used in conjunction with rear fastening means 118 (see FIG. 2).

Figure 2:
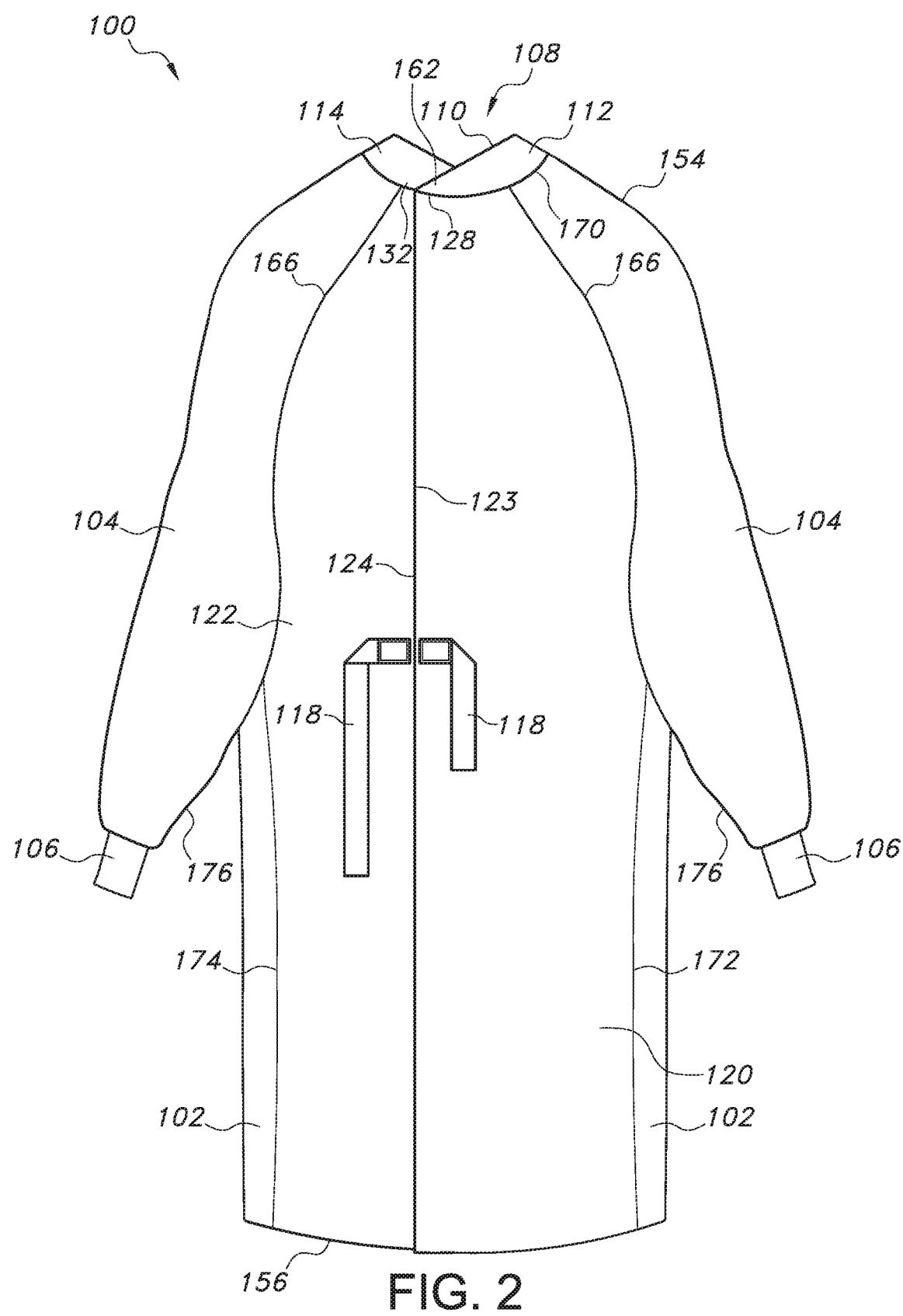
FIG. 2 illustrates a rear view of one embodiment of the disposable surgical gown contemplated by the present invention.

FIG. 2 illustrates a rear of the disposable surgical gown 100. The proximal end 154 and the distal end 156 define a first rear panel 120 and a second rear panel 122, which can be formed of a laminate of nonwoven materials, as discussed in more detail below. The first rear panel 120 can be sewn to the front panel 102 at a seam 172, while the second rear panel 122 can be sewn to the front panel 102 at a seam 174, where the first rear panel 120 can be ultrasonically bonded to the front panel 102 at seam 172 and the second rear panel 122 can be ultrasonically bonded to the front panel 102 at seam 174, where the ultrasonic bonding results in seams 172 and 174 that have improved liquid barrier protection than sewn seams. For instance, such ultrasonic bonding of the rear panels 120 and 122 to the front panel 102 can result in seams 172 and 174 that can have a hydrohead ranging from about 25 cm to about 100 cm, such as from about 30 cm to about 75 cm, such as from about 40 cm to about 60 cm, while sewn seams only have a hydrohead of about 7 cm, where the hydrohead is determined by providing a clear open-ended tube and clamping the seamed material over the bottom end, filling the tube slowly with water from its top end, and measuring how high the column of water is before water passes through the bottom end of the tube. Further, rear fastening means 118 can be ultrasonically welded to the edge 123 of the first rear panel 120 and the edge 124 of the second rear panel 122. As shown, the edge 123 of the first rear panel 120 can overlap the edge 124 of the second rear panel 122 when the rear fastening means 118 are tied to secure the gown 100 in place, although it is also to be understood that the edge 124 of the second rear panel 122 can overlap the edge 123 of the first rear panel 120 when the rear fastening means 118 are tied to secure the gown 100 in place. One or both rear fastening means 118 can also be wrapped around the gown 100 and secured to the front fastening means 116.

Figure 3:
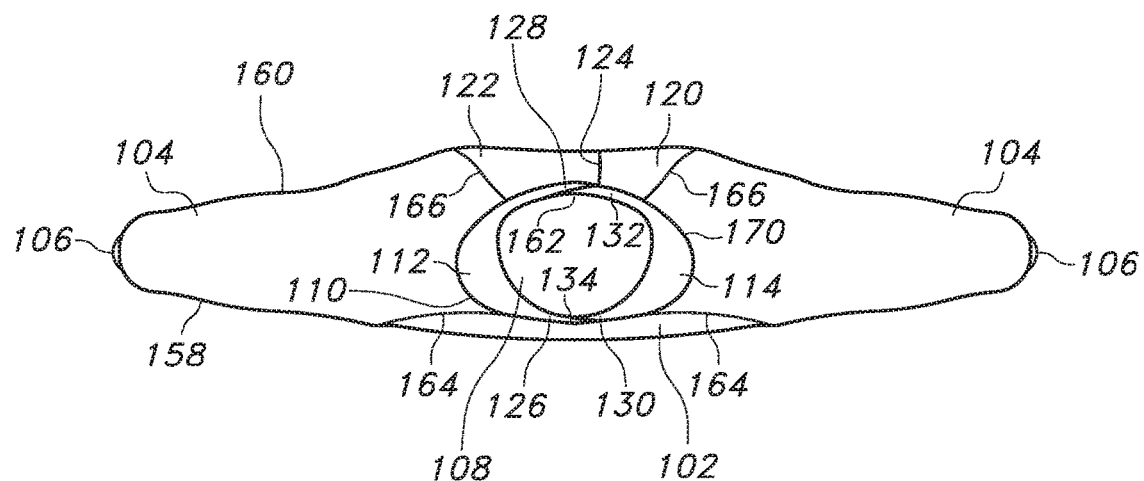
FIG. 3 illustrates a top view of one embodiment of the disposable surgical gown contemplated by the present invention.

FIG. 3 illustrates a top view of the disposable surgical gown 100 to show the collar 110 of FIGS. 1 and 2 in more detail. As shown, the front of the collar 110 can have a v-neck shape and defines an opening 108. The collar 110 can be formed from a separate first portion 112 having a first end 126 located at the front 158 of the gown 100 and a second end 128 located at the rear 160 of the gown, and a separate second portion 114 having a first end 130 located at the front 158 of the gown and a second end 132 located at the rear 160 of the gown 100. As shown, the first end 126 of the first portion 112 and the first end 130 of the second portion 114 of the collar 110 meet at an overlapping section 134 towards the center of the proximal end 154 of the front 158 of the gown 100 to form the v-neck shape. The v-neck shape can define an angle Θ formed between the first portion 112 and the second portion 114 of the collar 110 that is greater than 90° C., such as from about 95° to about 140°, such as from about 100° to about 135°, such as from about 110° to about 130°, as shown in more detail with reference to FIG. 4 below. The combination of the angle of the v-neck shaped opening 108 of the collar 110 and the stretchable material from which the collar 110 is formed as discussed in more detail below, can prevent gapping of the collar 110 when the gown 100 is worn, resulting in enhanced barrier protection to the wearer while at the same time increasing the wearer's comfort. Further, the v-neck shaped opening 108 can facilitate the dissipation of trapped humidity and heat between the gown 100 and the wearer, particularly in combination with the rear panels 120 and 122, which are formed from air breathable materials as discussed below. Meanwhile, the second end 128 of the first portion 112 and the second end 132 of the second portion 114 of the collar 110 meet at an overlapping section 162 towards the center of the proximal end 154 of the rear 160 of the gown 100 when the gown 100 is secured about the wearer. As shown and as discussed in more detail with reference to FIG. 5 below, the second end 128 of the first portion 112 of the collar 110 and the second end 132 of the second portion 114 of the collar 110 are tapered to allow for the gown 100 to be easily secured about the wearer and likewise easily removed from the wearer.

Figure 4:
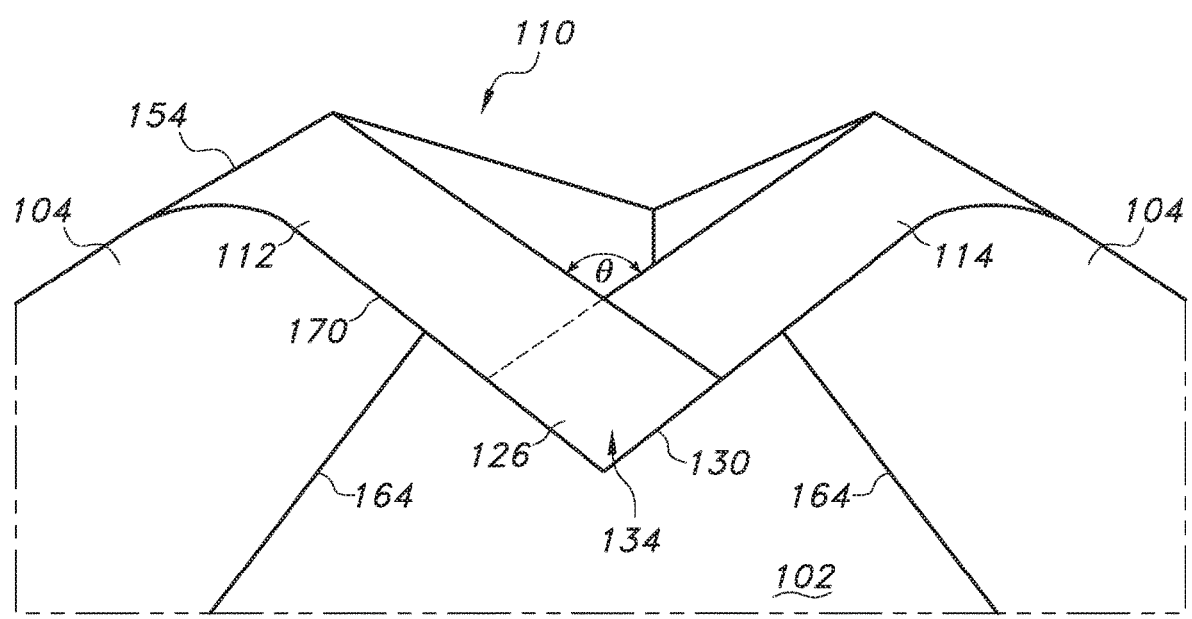
FIG. 4 illustrates a close up front view of one embodiment of the collar of the disposable surgical gown the present invention.

Referring now to the front 158 of the gown 100, FIG. 4 illustrates a zoomed-in front view of the first portion 112 and the second portion 114 of the collar 110 in more detail. As shown, the first end 126 of the first portion 112 can be positioned over the first end 130 of the second portion 114 of the collar 110 to form the overlapping section 134. However, it is also to be understood that the first end 130 of the second portion 114 of the collar 110 can be positioned over the first end 126 of the first portion 112 of the collar 100 to form the overlapping section 134. In any event, the combination of the overlapping section 134 and the v-neck shape of the overlap perimeter as defined by the angle Θ can prevent gapping of the collar 110 when the wearer moves or leans over, which minimizes the risk blood splatter, bone fragments, etc. from potentially coming into contact with the wearer.

Figure 5:
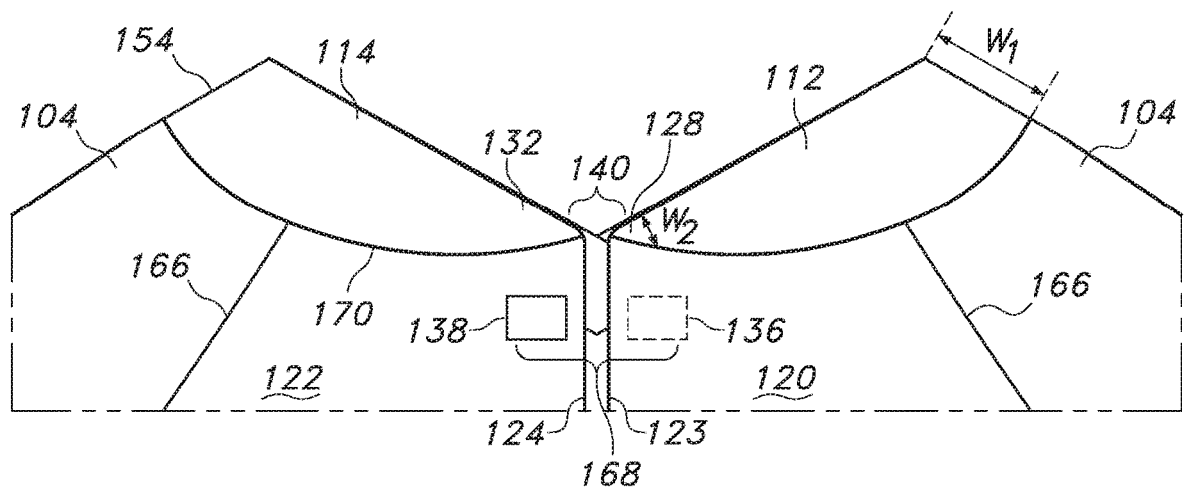
FIG. 5 illustrates a close up rear view of one embodiment of the collar of the disposable surgical gown the present invention.

Turning now to the rear 160 of the gown 100, FIG. 5 illustrates a zoomed-in rear view of the first portion 112 and the second portion 114 of the collar 110 before the gown 100 has been secured about the wearer to show the tapering of the first portion 112 and the second portion 114 of the collar 110 in more detail. As shown, the first portion 112 and the second portion 114 of the collar 110 gradually taper such that the collar width W2 near the location where the first rear panel 120 meets the second rear panel 122 to secure the gown 100 about the wearer is smaller than the collar width W1 where the sleeves 104 meet the collar 110. Such a difference in width creates a tapered section 140 of the collar at the second end 128 of the first portion 112 of the collar 110 and the second end 132 of the second portion 114 of the collar 100. The tapered section 140 allows for the use of a hook and loop fastening means 168 that can be made for polyethylene and nylon. The fastening means 168 includes a hook material 136 secured to an inner-facing surface of the first rear panel 120 and a loop material 138 secured to an outer-facing surface the second rear panel 122 so that when the first rear panel 120 overlaps the second rear panel 122, the gown 100 can be secured about the wearer without the collar 110 hindering the contact between the hook material 136 and the loop material 138. It should be noted that the dashed line perimeter of the hook material 136 indicates that the hook material 136 is secured to the inner-facing surface of the first rear panel 120. However, it is to be understood that any arrangement of the hook material 136 and loop material 138 is contemplated by the present invention depending, for instance, on which rear panel is to overlap the other rear panel to secure the gown 100 about the wearer. In any event, the tapering of the collar 110 can prevent the hook and loop fastening means 168 from interfering with the collar 110 during removal of the gown 100, which could make removal difficult given the stretchable nature of the material from which the collar 110 is made. Further, the tapering can also prevent the hook and loop fastening means 168 from becoming inadvertently caught in or attached to a wearer's bouffant cap, the occurrence of which is irritating to the wearer.

Figure 6:
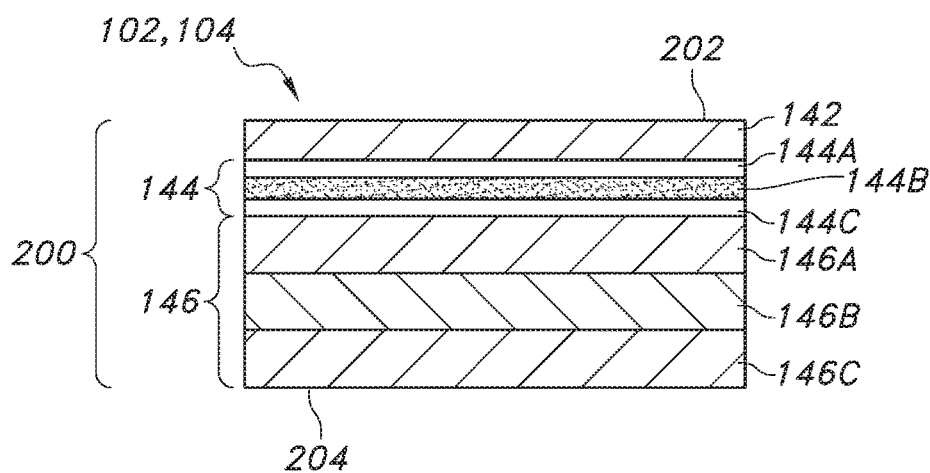
FIG. 6 illustrates a cross-sectional view of one embodiment of a first material used in forming the front panel and sleeves of the disposable surgical gown of the present invention.

FIG. 6 illustrates a cross-sectional view of a first material 200 which can be used to form the front panel 102, the sleeves 104, and the front fastening means 116 of the surgical gown 100 of FIGS. 1-5, where the first material 200 passes ASTM-1671 "Standard Test Method for Resistance of Materials Used in Protective Clothing to Penetration by Blood-Borne Pathogens Using Phi-X174 Bacteriophage Penetration as a Test System." The first material 200 can be a laminate that includes an outer spunbond layer 142, an elastic film 144 containing an first skin layer 144A and a second skin layer 144C with a core layer 144B disposed therebetween, and a spunbond-meltblown-spunbond laminate 146 containing a spunbond layer 146A and a spunbond layer 146C with a meltblown layer 146B disposed therebetween. The outer spunbond layer 142 can form an outer-facing surface 202 of the front panel 102, sleeves 104, and front fastening means 116 of the surgical gown 100, while the spunbond layer 146C of the SMS laminate 146 can form the body-facing surface or inner-facing surface 204 of the front panel 102 and sleeves 104 of the surgical gown 100. Meanwhile, the inner-facing surface 204 of the front fastening means 116 can include a tape material (not shown) for added barrier protection. As discussed in more detail below, the outer spunbond layer 142 and one or more layers of the SMS laminate 146 can include a slip additive to enhance the softness and comfort of the first material 200, while one or more layers of the elastic film 144 can include a fluoro-chemical additive to enhance the barrier performance of the first material 200. The overall spunbond-film-SMS laminate arrangement of the first material 200 contributes to the moisture vapor breathability of the surgical gown 100.

Figure 7:
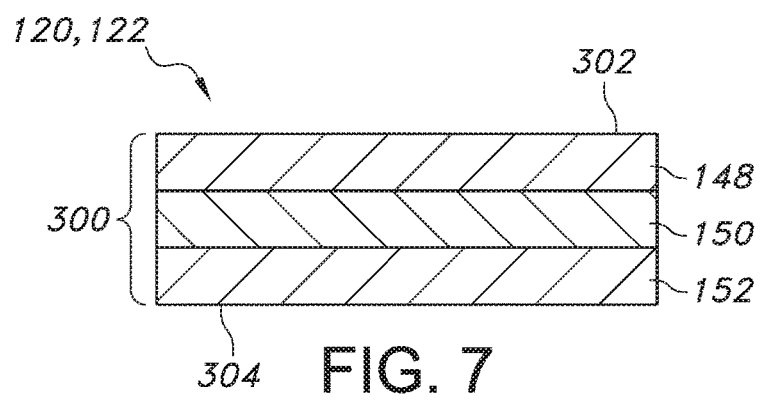
FIG. 7 illustrates a cross-sectional view of one embodiment of a second material used in forming the first rear panel and the second rear panel of the disposable surgical gown of the present invention.

FIG. 7 illustrates a second material 300 that can be used to form the surgical gown 100 of FIGS. 1-5, where the second material 300 can form the first rear panel 120, the second rear panel 122, and the rear fastening means 118. The second material 300 can be a laminate that includes a first spunbond layer 148, a meltblown layer 150, and a second spunbond layer 152. The first spunbond layer 148 can form an outer-facing surface 302 of the first rear panel 120, the second rear panel 122, and the rear fastening means 118 of the surgical gown 100, while the second spunbond layer 152 can form the body-facing surface or inner-facing surface 304 of the first rear panel 120, the second rear panel 122, and the rear fastening means 118 of the surgical gown 100. As discussed in more detail below, the spunbond layers 148 and 152 can include a slip additive to enhance the softness and comfort of the second material 300, while the overall spunbond-meltblown-spunbond (SMS) laminate arrangement of the second material contributes to the air breathability of the surgical gown 100.

The various components of the protective garment are discussed in more detail below. As an initial matter, it is to be understood that any of the spunbond layers, meltblown layers, or elastic film layers of the first material 200 and/or the second material 300 can include pigments to impart the gown 100 with a gray color, which provides anti-glare and light reflectance properties, which, in turn, can provide a better visual field during surgeries or other procedures where operating room lighting can result in poor visual conditions, resulting in glare that causes visual discomfort, and leads to fatigue of operating room staff during surgical procedures.

For instance, examples of suitable pigments used to arrive at the desired gray pigment for the gown include, but are not limited to, titanium dioxide (e.g., SCC 11692 concentrated titanium dioxide), zeolites, kaolin, mica, carbon black, calcium oxide, magnesium oxide, aluminum hydroxide, and combinations thereof. In certain cases, for instance, each of the various individual layers of the gown materials 200 and 300 can include titanium dioxide in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the individual layer. The titanium dioxide can have a refractive index ranging from about 2.2 to about 3.2, such as from about 2.4 to about 3, such as from about 2.6 to about 2.8, such as about 2.76, to impart the material 200 with the desired light scattering and light absorbing properties. Further, each of the various individual layers of the gown materials 200 and 300 can also include carbon black in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the individual layer. The carbon black can have a refractive index ranging from about 1.2 to about 2.4, such as from about 1.4 to about 2.2, such as from about 1.6 to about 2 to impart the material 200 with the desired light scattering and light absorbing properties. Each of the various individual layers of the gown materials 200 and 300 can also include a blue pigment in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the individual layer. The combination of the carbon black and blue pigment improves the ability of the nonwoven materials and film of the present invention to absorb light.

As a result of the incorporation of one or more of the aforementioned pigments into the gown materials, the first material 200 and/or the second material 300 can thus be a sufficient shade of gray to prevent glare. Gray is an imperfect absorption of the light or a mixture of black and white, where it is to be understood that although black, white, and gray are sometimes described as achromatic or hueless colors, a color may be referred to as "black" if it absorbs all frequencies of light, That is, an object that absorbs all wavelengths of light that strike it so that no parts of the spectrum are reflected is considered to be black. Black is darker than any color on the color wheel or spectrum. In contrast, white is fighter than any color on the color wheel or spectrum. If an object reflects all wavelengths of light equally, that object is considered to be white.

I. Front Panel, Sleeves, and Front Fastening Means

As mentioned above, the front panel 102, sleeves 104, and front fastening means 116 of the gown 100 can be formed from a first material 200. The first material 200 can be a stretchable elastic breathable barrier material that renders the aforementioned sections of the gown 100 impervious to bodily fluids and other liquids while still providing satisfactory levels of moisture vapor breathability and/or moisture vapor transmission and stretchabiilty. The first material 200 can include a combination of a film, which can serve as the key barrier and elastic component of the surgical gown 100, and one or more nonwoven layers (e.g., spunbond layers, meltblown layers, a combination thereof, etc) to provide softness and comfort. The film can be configured to exhibit elastic properties such that the film maintains its fluid barrier characteristics even when elongated in the machine direction by amounts at least as twice as high as currently available gowns such that the gown 100 passes ASTM-1671 "Standard Test Method for Resistance of Materials Used in Protective Clothing to Penetration by Blood-Borne Pathogens Using Phi-X174 Bacteriophage Penetration as a Test System." Meanwhile, as a result of the inclusion of the nonwoven layers in conjunction with the elastic film, the overall first material 200 can have an increased bending modulus to achieve the desired pliability and softness which results in a material that is comfortable to the wearer.

As discussed above, in one particular embodiment, the first material 200 can include an outer spunbond layer 142, a spunbond-meltblown-spunbond laminate 146, and an elastic film 144 positioned therebetween. The outer spunbond layer 142 can form an outer-facing surface 202 of the front panel 102, sleeves 104, and front fastening means 116 of the surgical gown 100, while one of the spunbond layers of the SMS laminate 146 can form the body-facing surface or inner-facing surface 204 of the front panel 102 and sleeves 104 of the surgical gown 100. Meanwhile, the inner-facing surface of the front fastening means 116 can include a tape material for added barrier protection. Further, the outer spunbond layer 142 and one or more layers of the SMS laminate 146 can include a slip additive to achieve the desired softness, while the film 144 can include a fluorochemical additive to increase the surface energy of the elastic film 144 and enhance the ability of the elastic film 144 to serve as a barrier to bodily fluids and tissues, including fatty oils that may be generated during very invasive surgeries as a result of the maceration of fatty tissue. Each of these components of the first material 200 is described in more detail below.

A. Outer Spunbond Layer

The outer spunbond layer 142 can be formed from any suitable polymer that provides softness, stretch, and pliability to the first material 200. For instance, the outer spunbond layer 142 can be formed from a semi-crystalline polyolefin. Exemplary polyolefins may include, for instance, polyethylene, polypropylene, blends and copolymers thereof. In one particular embodiment, a polyethylene is employed that is a copolymer of ethylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin co-monomers are 1-butene, 1-hexene and 1-octene. The ethylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

The density of the polyethylene may vary depending on the type of polymer employed, but generally ranges from 0.85 to 0.96 grams per cubic centimeter ("g/cm$^3$"). Polyethylene "plastomers", for instance, may have a density in the range of from 0.85 to 0.91 g/cm$^3$. Likewise, "linear low density polyethylene" ("LLDPE") may have a density in the range of from 0.91 to 0.940 g/cm$^3$; "low density polyethylene" ("LDPE") may have a density in the range of from 0.910 to 0.940 g/cm$^3$; and "high density polyethylene" ("HDPE") may have density in the range of from 0.940 to 0.960 g/cm$^3$. Densities may be measured in accordance with ASTM 1505. Particularly suitable ethylene-based polymers for use in the present invention may be available under the designation EXACT™ from ExxonMobil Chemical Company of Houston, Tex. Other suitable polyethylene plastomers are available under the designation ENGAGE™ and AFFINITY™ from Dow Chemical Company of Midland, Mich. Still other suitable ethylene polymers are available from The Dow Chemical Company under the designations DOWLEX™ (LLDPE) and ATTANE™ (ULDPE). Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai et al.; and U.S. Pat. No. 5,278,272 to Lai, et al., which are incorporated herein in their entirety by reference thereto for all purposes.

Of course, the outer spunbond layer 142 of the first material 200 is by no means limited to ethylene polymers. For instance, propylene polymers may also be suitable for use as a semi-crystalline polyolefin. Suitable propylene polymers may include, for instance, polypropylene homopolymers, as well as copolymers or terpolymers of propylene with an α-olefin (e.g., $C_3$-$C_{20}$) comonomer, such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some embodiments from about 1 wt. % to about 20 wt. %, in some embodiments, from about 2 wt. % to about 15 wt. %, and in some embodiments from about 3 wt. % to about 10 wt. %. The density of the polypropylene (e.g., propylene/α-olefin copolymer) may be 0.95 grams per cubic centimeter ($g/cm^3$) or less, in some embodiments, from 0.85 to 0.92 $g/cm^3$, and in some embodiments, from 0.85 $g/cm^3$ to 0.91 $g/cm^3$. In one particular embodiment, the outer spunbond layer 142 can include a copolymer of polypropylene and polyethylene. The polypropylene can have a refractive index ranging from about 1.44 to about 1.54, such as from about 1.46 to about 1.52, such as from about 1.48 to about 1.50, such as about 1.49, while the polyethylene can have a refractive index ranging from about 1.46 to about 1.56, such as from about 1.48 to about 1.54, such as from about 1.50 to about 1.52, such as about 1.51, to impart the material 200 with the desired light scattering and light absorbing properties.

Suitable propylene polymers are commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques may generally be employed to form the polyolefins. For instance, olefin polymers may be formed using a free radical or a coordination catalyst (e.g., Ziegler-Natta or metallocene). Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al., which are incorporated herein in their entirety by reference thereto for all purposes.

The melt flow index (MI) of the polyolefins may generally vary, but is typically in the range of about 0.1 grams per 10 minutes to about 100 grams per 10 minutes, in some embodiments from about 0.5 grams per 10 minutes to about 30 grams per 10 minutes, and in some embodiments, about 1 to about 10 grams per 10 minutes, determined at 190° C. The melt flow index is the weight of the polymer (in grams) that may be forced through an extrusion rheometer orifice (0.0825-inch diameter) when subjected to a force of 2160 grams in 10 minutes at 190° C., and may be determined in accordance with ASTM Test Method D1238-E.

In addition to a polyolefin, the outer spunbond layer 142 can also include a slip additive to enhance the softness of the outer spunbond layer 142. The slip additive can also reduce the coefficient of friction and increase the hydrohead of the outer spunbond layer 142 of the front panel 102 and the sleeves 104. Such a reduction in the coefficient of friction lessens the chance of the gown 100 being cut or damaged due to abrasions and also prevents fluids from seeping through the first material 200. Instead, at least in part due to the inclusion of the slip additive, fluid that contacts the outer-facing surface 202 of the gown 100 can remain in droplet form and run vertically to the distal end 156 of the gown 100 and onto the floor. The slip additive can also reduce the glare of the first material 200 in the operating room by reducing the light reflectance of the first material and can also render the first material 200 more opaque than the standard gown material when contacted with fats and lipids during surgery, where the standard gown material turns transparent upon contact with fats and lipids, which can result in the wearer having some concern that the barrier properties of a standard gown have been compromised.

The slip additive can function by migrating to the surface of the polymer used to form the outer spunbond layer 142, where it can provide a coating that reduces the coefficient of friction of the outer-facing surface 202 of the first material 200. Variants of fatty acids can be used as slip additives. For example, the slip additive can be erucamide, oleamide, stearamide, behenamide, oleyl palmitamide, stearyl erucamide, ethylene bis-oleamide, N,N'-Ethylene Bis(Stearamide) (EBS), or a combination thereof. Further, the slip additive have a refractive index ranging from about 1.42 to about 1.52, such as from about 1.44 to about 1.50, such as from about 1.46 to about 1.48, such as about 1.47, to impart the material 200 with the desired light scattering and light absorbing properties by reducing the refractive index. The slip additive can be present in the outer spunbond layer 142 in an amount ranging from about 0.1 wt. % to about 4 wt. %, such as from about 0.25 wt. % to about 3 wt. %, such as from about 0.5 wt. % to about 2 wt. % based on the total weight of the outer spunbond layer 142. In one particular embodiment, the slip additive can be present in an amount of about 1 wt. % based on the total weight of the outer spunbond layer 142.

In addition to the polyolefin and slip additive, the outer spunbond layer 142 can also include one or more pigments to help achieve the desired gray color of the gown 100. Examples of suitable pigments include, but are not limited to, titanium dioxide (e.g., SCC 11692 concentrated titanium dioxide), zeolites, kaolin, mica, carbon black, calcium oxide, magnesium oxide, aluminum hydroxide, and combinations thereof. In certain cases, for instance, the outer spunbond layer 142 can include titanium dioxide in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the outer spunbond layer 142. The titanium dioxide can have a refractive index ranging from about 2.2 to about 3.2, such as from about 2.4 to about 3, such as from about 2.6 to about 2.8, such as about 2.76, to impart the material 200 with the desired light scattering and light absorbing properties. Further, the outer spunbond layer 142 can also include carbon black in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the outer spunbond layer 142. The carbon black can have a refractive index ranging from about 1.2 to about 2.4, such as from about 1.4 to about 2.2, such as from about 1.6 to about 2 to impart the material 200 with the desired light scattering and light absorbing properties. The outer spunbond layer 142 can also include a blue pigment in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the individual layer. The combination of the carbon black and blue pigment improves the ability of the outer spunbond layer 142 to absorb light.

Regardless of the specific polymer or polymers and additives used to form the outer spunbond layer 142, the outer spunbond layer 142 can have a basis weight ranging from about 5 gsm to about 50 gsm, such as from about 10 gsm to about 40 gsm, such as from about 15 gsm to about 30 gsm. In one particular embodiment, the outer spunbond layer 142 can have a basis weight of about 20 gsm (about 0.6 osy).

B. Elastic Film

The elastic film 144 of the first material 200 can be formed from any suitable polymer or polymers that are capable of acting as a barrier component in that it is generally impervious, while at the same time providing moisture vapor breathability to the first material 200. The elastic film 144 can be formed from one or more layers of polymers that are melt-processable, i.e., thermoplastic. In one particular embodiment, the elastic film 144 can be a monolayer film. If the film is a monolayer, any of the polymers discussed below in can be used to form the monolayer. In other embodiments, the elastic film 144 can include two, three, four, five, six, or seven layers, where each of the layers can be formed from any of the polymers discussed below, where the one or more layers are formed from the same or different materials. For instance, in one particular embodiment the elastic film 144 can include a core layer 144B disposed between two skin layers, 144A and 144C. Each of these components of the film are discussed in more detail below.

First, the elastic film core layer 144B can be formed from one or more semi-crystalline polyolefins. Exemplary semi-crystalline polyolefins include polyethylene, polypropylene, blends and copolymers thereof. In one particular embodiment, a polyethylene is employed that is a copolymer of ethylene and an $\alpha$-olefin, such as a $C_3$-$C_{20}$ $\alpha$-olefin or $C_3$-$C_{12}$ $\alpha$-olefin. Suitable $\alpha$-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired $\alpha$-olefin comonomers are 1-butene, 1-hexene and 1-octene. The ethylene content of such copolymers may be from about 60 mole % to about 99 mole %, in some embodiments from about 80 mole % to about 98.5 mole %, and in some embodiments, from about 87 mole % to about 97.5 mole %. The $\alpha$-olefin content may likewise range from about 1 mole % to about 40 mole %, in some embodiments from about 1.5 mole % to about 15 mole %, and in some embodiments, from about 2.5 mole % to about 13 mole %.

Particularly suitable polyethylene copolymers are those that are "linear" or "substantially linear." The term "substantially linear" means that, in addition to the short chain branches attributable to comonomer incorporation, the ethylene polymer also contains long chain branches in the polymer backbone. "Long chain branching" refers to a chain length of at least 6 carbons. Each long chain branch may have the same comonomer distribution as the polymer backbone and be as long as the polymer backbone to which it is attached. Preferred substantially linear polymers are substituted with from 0.01 long chain branch per 1000 carbons to 1 long chain branch per 1000 carbons, and in some embodiments, from 0.05 long chain branch per 1000 carbons to 1 long chain branch per 1000 carbons. In contrast to the term "substantially linear", the term "linear" means that the polymer lacks measurable or demonstrable long chain branches. That is, the polymer is substituted with an average of less than 0.01 long chain branch per 1000 carbons.

The density of a linear ethylene/$\alpha$-olefin copolymer is a function of both the length and amount of the $\alpha$-olefin. That is, the greater the length of the $\alpha$-olefin and the greater the amount of $\alpha$-olefin present, the lower the density of the copolymer. Although not necessarily required, linear polyethylene "plastomers" are particularly desirable in that the content of $\alpha$-olefin short chain branching content is such that the ethylene copolymer exhibits both plastic and elastomeric characteristics—i.e., a "plastomer." Because polymerization with $\alpha$-olefin comonomers decreases crystallinity and density, the resulting plastomer normally has a density lower than that of a polyethylene thermoplastic polymer (e.g., LLDPE), which typically has a density (specific gravity) of from about 0.90 grams per cubic centimeter (g/cm$^3$) to about 0.94 g/cm$^3$, but approaching and/or overlapping that of an elastomer, which typically has a density of from about 0.85 g/cm$^3$ to about 0.90 g/cm$^3$, preferably from 0.86 to 0.89. For example, the density of the polypropylene (e.g., propylene/$\alpha$-olefin copolymer) may be 0.95 grams per cubic centimeter (g/cm$^3$) or less, in some embodiments, from 0.85 to 0.92 g/cm$^3$, and in some embodiments, from 0.85 g/cm$^3$ to 0.91 g/cm$^3$. Despite having a density similar to elastomers, plastomers generally exhibit a higher degree of crystallinity, are relatively non-tacky, and may be formed into pellets that are non-adhesive-like and relatively free flowing.

Preferred polyethylenes for use in the present invention are ethylene-based copolymer plastomers available under the designation EXACT™ from ExxonMobil Chemical Company of Houston, Tex. Other suitable polyethylene plastomers are available under the designation ENGAGE™ and AFFINITY™ from Dow Chemical Company of Midland, Mich. An additional suitable polyethylene-based plastomer is an olefin block copolymer available from Dow Chemical Company of Midland, Mich. under the trade designation INFUSE™, which is an elastomeric copolymer of polyethylene. Still other suitable ethylene polymers are low density polyethylenes (LDPE), linear low density polyethylenes (LLDPE) or ultralow linear density polyethylenes (ULDPE), such as those available from The Dow Chemical Company under the designations ASPUN™ (LLDPE), DOWLEX™ (LLDPE) and ATTANE™ (ULDPE). Other suitable ethylene polymers are described in U.S. Pat. No. 4,937,299 to Ewen, et al., U.S. Pat. No. 5,218,071 to Tsutsui et al., U.S. Pat. No. 5,272,236 to Lai et al., and U.S. Pat. No. 5,278,272 to Lai, et al., which are incorporated herein in their entirety by reference thereto for all purposes.

Of course, the elastic film core layer 144B of the present invention is by no means limited to ethylene polymers. For instance, propylene plastomers may also be suitable for use in the film. Suitable plastomeric propylene polymers may include, for instance, polypropylene homopolymers, copolymers or terpolymers of propylene, copolymers of propylene with an $\alpha$-olefin (e.g., $C_3$-$C_{20}$) comonomer, such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some embodiments from about 1 wt. % to about 20 wt. %, in some embodiments from about 2 wt. % to about 15 wt. %, and in some embodiments from about 3 wt. % to about 10 wt. %. Preferably, the density of the polypropylene (e.g., propylene/$\alpha$-olefin copolymer) may be 0.95 grams per cubic centimeter (g/cm$^3$) or less, in some embodiments, from 0.85 to 0.92 g/cm$^3$, and in some embodiments, from 0.85 g/cm$^3$ to 0.91 g/cm$^3$.

Suitable propylene polymers are commercially available under the designations VISTAMAXX™ (e.g., 6102), a propylene-based elastomer from ExxonMobil Chemical Co.

of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 5,539,056 to Yang, et al., U.S. Pat. No. 5,596,052 to Resconi, et al., and U.S. Pat. No. 6,500,563 to Datta, et at, which are incorporated herein in their entirety by reference thereto for all purposes. In one particular embodiment, the elastic film core layer 144B includes polypropylene. The polypropylene can have a refractive index ranging from about 1.44 to about 1.54, such as from about 1.46 to about 1.52, such as from about 1.48 to about 1.50, such as about 1.49 to help impart the material 200 with the desired light scattering and light absorbing properties.

Any of a variety of known techniques may generally be employed to form the semi-crystalline polyolefins. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,272,236 to Lai et al., U.S. Pat. No. 5,322,728 to Davis et al., U.S. Pat. No. 5,472,775 to Obiieski et al., U.S. Pat. No. 5,571,619 to McAlpin et al., and U.S. Pat. No. 6,090,325 to Wheat, et al., which are incorporated herein in their entirety by reference thereto for all purposes. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl) zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

The melt flow index (MI) of the semi-crystalline polyolefins may generally vary, but is typically in the range of about 0.1 grams per 10 minutes to about 100 grams per 10 minutes, in some embodiments from about 0.5 grams per 10 minutes to about 30 grams per 10 minutes, and in some embodiments, about 1 to about 10 grams per 10 minutes, determined at 190° C. The melt flow index is the weight of the polymer (in grams) that may be forced through an extrusion rheometer orifice (0.0825-inch diameter) when subjected to a force of 5000 grams in 10 minutes at 190° C., and may be determined in accordance with ASTM Test Method D1238-E.

In addition to a polyolefin such as polypropylene, the elastic film core layer 144B can also include a fluorochemical additive to increase the surface energy of the elastic film 144, which, in turn, increases the imperviousness of the elastic film 144 to bodily fluids and biologic materials such as fatty oils that may be generated during very invasive surgeries. One example of a fluorochemical additive contemplated for use in the core layer 144B is a fluoroalkyl acrylate copolymer such as Unidyne® TG from Daikin. The fluorochemical additive can have a refractive index that is less than about 1.4 in order to lower the refractive index of the elastic film core layer 144B. For instance, the fluorochemical additive can have a refractive index ranging from about 1.2 to about 1.4, such as from about 1.22 to about 1.38, such as from about 1.24 to about 1.36. Without intending to be limited by any particular theory, it is believed that the fluorochemical additive segregates to the surface of the polyolefin film, where a lower refractive index region is formed, which enhances light scattering of the film as compared to films that are free of a fluorochemical additive. Regardless of the particular fluorochemical additive utilized, the fluorochemical additive can be present in the elastic film core layer 144B in an amount ranging from about 0.1 wt. % to about 5 wt. %, such as from about 0.5 wt. % to about 4 wt. %, such as from about 1 wt. % to about 3 wt. % based on the total weight of the elastic film core layer 144B. In one particular embodiment, the fluorochemical additive can be present in an amount of about 1.5 wt. % based on the total weight of the elastic film core layer 144B.

In one embodiment, the elastic film core layer 144B can also include a filler. Fillers are particulates or other forms of material that may be added to the film polymer extrusion blend and that will not chemically interfere with the extruded film, but which may be uniformly dispersed throughout the film. Fillers may serve a variety of purposes, including enhancing film opacity and/or breathability (i.e., vapor-permeable and substantially liquid-impermeable). For instance, filled films may be made breathable by stretching, which causes the polymer to break away from the filler and create microporous passageways. Breathable microporous elastic films are described, for example, in U.S. Pat. No. 5,932,497 to Morman, et al., U.S. Pat. Nos. 5,997,981, 6,015,764, and 6,111,163 to McCormack, et al., and U.S. Pat. No. 6,461,457 to Taylor, et al., which are incorporated herein in their entirety by reference thereto for all purposes. Examples of suitable fillers include, but are not limited to, calcium carbonate, various kinds of clay, silica, alumina, barium carbonate, sodium carbonate, magnesium carbonate, talc, barium sulfate, magnesium sulfate, aluminum sulfate, zeolites, cellulose-type powders, kaolin, mica, carbon, calcium oxide, magnesium oxide, aluminum hydroxide, pulp powder, wood powder, cellulose derivatives, chitin and chitin derivatives. In one particular embodiment, the filler in the core layer 144B can include calcium carbonate, which can provide the elastic film 144, and thus the material 200, with light scattering and light absorbing properties to help reduce glare, particularly after stretching the calcium carbonate-containing core layer 144B, which further increases the opacity and increases the light scattering of the material 200. For instance, the calcium carbonate (or any other suitable filler) can have a refractive index ranging from about 1.60 to about 1.72, such as from about 1.62 to about 1.70, such as from about 1.64 to about 1.68, such as about 1.66, to impart the material 200 with the desired light scattering and light absorbing properties. In certain cases, the filler content of the film may range from about 50 wt. % to about 85 wt. %, in some embodiments, from about 55 wt. % to about 80 wt. %, and in some embodiments, from about 60 wt. % to about 75 wt. % of the elastic film core layer 1446 based on the total weight of the elastic film core layer 144B.

Further, the elastic film core layer 1446 can also include one or more pigments to help achieve the desired gray color of the gown 100. Examples of suitable pigments include, but are not limited to, titanium dioxide (e.g., SCC 11692 concentrated titanium dioxide), zeolites, kaolin, mica, carbon black, calcium oxide, magnesium oxide, aluminum hydroxide, and combinations thereof. In certain cases, for instance, the elastic film core layer 144B can include titanium dioxide in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the core layer 144B. The titanium dioxide can have a refractive index ranging from about 2.2 to about 3.2, such as from about 2.4 to about 3, such as from about 2.6 to about 2.8, such as about 2.76, to impart the material 200 with the desired light scattering and light absorbing properties. Further, the elastic film core layer 1446 can also include carbon black in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the core layer 144B. The carbon black can have a refractive index ranging from about 1.2 to about 2.4, such as from about 1.4 to about 2.2, such as from about 1.6 to about 2 to impart the material 200 with the desired light scattering and light absorbing properties. The elastic film core layer 144B can also include a blue pigment in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the individual layer. The combination of the carbon black and blue pigment improves the ability of the elastic film core layer 144B to absorb light.

Further, like the elastic film core layer 144B, the elastic film skin layers 144A and 144C that sandwich the elastic film core layer 1446 can also be formed from one or more semi-crystalline polyolefins. Exemplary semi-crystalline polyolefins include polyethylene, polypropylene, blends and copolymers thereof. In one particular embodiment, a polyethylene is employed that is a copolymer of ethylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Particularly suitable polyethylene copolymers are those that are "linear" or "substantially linear." The term "substantially linear" means that, in addition to the short chain branches attributable to comonomer incorporation, the ethylene polymer also contains long chain branches in the polymer backbone. "Long chain branching" refers to a chain length of at least 6 carbons. Each long chain branch may have the same comonomer distribution as the polymer backbone and be as long as the polymer backbone to which it is attached. Preferred substantially linear polymers are substituted with from 0.01 long chain branch per 1000 carbons to 1 long chain branch per 1000 carbons, and in some embodiments, from 0.05 long chain branch per 1000 carbons to 1 long chain branch per 1000 carbons. In contrast to the term "substantially linear", the term "linear" means that the polymer lacks measurable or demonstrable long chain branches. That is, the polymer is substituted with an average of less than 0.01 long chain branch per 1000 carbons.

The density of a linear ethylene/α-olefin copolymer is a function of both the length and amount of the α-olefin. That is, the greater the length of the α-olefin and the greater the amount of α-olefin present, the lower the density of the copolymer. Although not necessarily required, linear polyethylene "plastomers" are particularly desirable in that the content of α-olefin short chain branching content is such that the ethylene copolymer exhibits both plastic and elastomeric characteristics—i.e., a "plastomer." Because polymerization with α-olefin comonomers decreases crystallinity and density, the resulting plastomer normally has a density lower than that of a polyethylene thermoplastic polymer (e.g., LLDPE), which typically has a density (specific gravity) of from about 0.90 grams per cubic centimeter (g/cm$^3$) to about 0.94 g/cm$^3$, but approaching and/or overlapping that of an elastomer, which typically has a density of from about 0.85 g/cm$^3$ to about 0.90 g/cm$^3$, preferably from 0.86 to 0.89. For example, the density of the polyethylene plastomer may be 0.91 g/cm$^3$ or less, in some embodiments from about 0.85 g/cm$^3$ to about 0.90 g/cm$^3$, in some embodiments, from 0.85 g/cm$^3$ to 0.88 g/cm$^3$, and in some embodiments, from 0.85 g/cm$^3$ to 0.87 g/cm$^3$. Despite having a density similar to elastomers, plastomers generally exhibit a higher degree of crystallinity, are relatively non-tacky, and may be formed into pellets that are non-adhesive-like and relatively free flowing.

Preferred polyethylenes for use in the present invention are ethylene-based copolymer plastomers available under the designation EXACT™ from ExxonMobil Chemical Company of Houston, Tex. Other suitable polyethylene plastomers are available under the designation ENGAGE™ and AFFINITY™ from Dow Chemical Company of Midland, Mich. An additional suitable polyethylene-based plastomer is an olefin block copolymer available from Dow Chemical Company of Midland, Mich. under the trade designation INFUSE™, which is an elastomeric copolymer of polyethylene. Still other suitable ethylene polymers are low density polyethylenes (LDPE), linear low density polyethylenes (LLDPE) or ultralow linear density polyethylenes (ULDPE), such as those available from The Dow Chemical Company under the designations ASPUN™ (LLDPE), DOWLEX™ (LLDPE) and ATTANE™ (ULDPE). Other suitable ethylene polymers are described in U.S. Pat. No. 4,937,299 to Ewen, et al., U.S. Pat. No. 5,218,071 to Tsutsui et al., U.S. Pat. No. 5,272,236 to Lai, et al., and U.S. Pat. No. 5,278,272 to Lai, et al., which are incorporated herein in their entirety by reference thereto for all purposes.

Of course, the elastic film skin layers 144A and 144C of the present invention are by no means limited to ethylene polymers. For instance, propylene plastomers may also be suitable for use in the film. Suitable plastomeric propylene polymers may include, for instance, polypropylene homopolymers, copolymers or terpolymers of propylene, copolymers of propylene with an α-olefin (e.g., $C_3$-$C_{20}$) comonomer, such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some embodiments from about 1 wt. % to about 20 wt. %, in some embodiments from about 2 wt. % to about 15 wt. %, and in some embodiments from about 3 wt. % to about 10 wt. %. The density of the polypropylene (e.g., propylene/α-olefin copolymer) may be 0.95 grams per cubic centimeter (g/cm$^3$) or less, in some embodiments, from 0.85 to 0.92 g/cm$^3$, and in some embodiments, from 0.85 g/cm$^3$ to 0.91 g/cm$^3$. In one particular embodiment, the elastic film skin layers 144A and 144C can include a copolymer of polypropylene and polyethylene. The polypropylene can have a refractive index ranging from about 1.44 to about 1.54, such as from about 1.46 to about 1.52, such as from about 1.48 to about 1.50, such as about 1.49, while the polyethylene can have a refractive index ranging from about 1.46 to about 1.56, such as from about 1.48 to about 1.54, such as from about 1.50 to about 1.52, such as about 1.51, to impart the material 200 with the desired light scattering and light absorbing properties.

Suitable propylene polymers are commercially available under the designations VISTAMAXX™ (e.g., 6102), a propylene-based elastomer from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 5,539,056 to Yang, et al., U.S. Pat. No. 5,596,052 to Resconi, et al., and U.S. Pat. No. 6,500,563 to Datta, et at, which are incorporated herein in their entirety by reference thereto for all purposes.

Any of a variety of known techniques may generally be employed to form the semi-crystalline polyolefins. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,272,236 to Lai et al., U.S. Pat. No. 5,322,728 to Davis et al., U.S. Pat. No. 5,472,775 to Obijeski et al., U.S. Pat. No. 5,571,619 to McAlpin et al., and U.S. Pat. No. 6,090,325 to Wheat, et al., which are incorporated herein in their entirety by reference thereto for all purposes. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl) zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

The melt flow index (MI) of the semi-crystalline polyolefins may generally vary, but is typically in the range of about 0.1 grams per 10 minutes to about 100 grams per 10 minutes, in some embodiments from about 0.5 grams per 10 minutes to about 30 grams per 10 minutes, and in some embodiments, about 1 to about 10 grams per 10 minutes, determined at 190° C. The melt flow index is the weight of the polymer (in grams) that may be forced through an extrusion rheometer orifice (0.0825-inch diameter) when subjected to a force of 5000 grams in 10 minutes at 190° C., and may be determined in accordance with ASTM Test Method D1238-E.

In addition, it is noted that the elastic film skin layers 144A and 144C are free of the fluorochemical additive that is present in the elastic film core layer 144B. As a result, the skin layers 144A and 144C have a higher refractive index than the elastic film core layer 144B, as the fluorochemical additive tends to lower the refractive index of the core layer 144B. The resulting difference in refractive indices at the interfaces between the core layer 1446 and the skin layers 144A and 144C of the elastic film 144 is thought to enhance light scattering, which can result in a high level of opacity and a low level of light reflection (e.g., reduced glare).

In any event, regardless of the number of layers present in the elastic film 144 and regardless of the specific polymer or polymers and additives used to form the elastic film 144, the elastic film 144 can have a basis weight ranging from about 5 gsm to about 50 gsm, such as from about 10 gsm to about 40 gsm, such as from about 15 gsm to about 30 gsm. In one particular embodiment, the elastic film 144 can have a basis weight of about 20 gsm (about 0.6 osy).

C. Spunbond Meltblown Spunbond (SMS) Laminate

The first material 200 also includes an SMS laminate 146 that is attached to the skin layer 144C of the elastic film 144. One of the spunbond layers 146C of the SMS laminate 146 can form the inner-facing surface 204 of the first material 200 of the gown 100, which is used to form the front panel 102, the sleeves 104, and the front fastening means 116. Further, it is to be understood that the spunbond layer 146A, which is adjacent the skin layer 144C, the spunbond layer 146C, and the meltblown layer 1466 disposed therebetween can be formed from any of the polymers (e.g., polyolefins) mentioned above with respect to the outer spunbond layer 142. In other words, the SMS laminate 146 can be formed from any suitable polymer that provides softness, stretch, and pliability to the first material 200.

In one particular embodiment, the SMS laminate 146 can include a first spunbond layer 146A and a second spunbond layer 146C, where the spunbond layers 146A and 146C can be formed from any suitable polymer that provides softness, stretch, and pliability to the first material 200. For instance, the spunbond layers 146A and 146C can be formed from a semi-crystalline polyolefin. Exemplary polyolefins may include, for instance, polyethylene, polypropylene, blends and copolymers thereof. In one particular embodiment, a polyethylene is employed that is a copolymer of ethylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin co-monomers are 1-butene, 1-hexene and 1-octene. The ethylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

The density of the polyethylene may vary depending on the type of polymer employed, but generally ranges from 0.85 to 0.96 grams per cubic centimeter ("g/cm$^3$"). Polyethylene "plastomers", for instance, may have a density in the range of from 0.85 to 0.91 g/cm$^3$. Likewise, "linear low density polyethylene" ("LLDPE") may have a density in the range of from 0.91 to 0.940 g/cm$^3$; "low density polyethylene" ("LDPE") may have a density in the range of from 0.910 to 0.940 g/cm$^3$; and "high density polyethylene" ("HDPE") may have density in the range of from 0.940 to 0.960 g/cm$^3$. Densities may be measured in accordance with ASTM 1505. Particularly suitable ethylene-based polymers for use in the present invention may be available under the designation EXACT™ from ExxonMobil Chemical Company of Houston, Tex. Other suitable polyethylene plastomers are available under the designation ENGAGE™ and AFFINITY™ from Dow Chemical Company of Midland, Mich. Still other suitable ethylene polymers are available from The Dow Chemical Company under the designations DOWLEX™ (LLDPE) and ATTANE™ (ULDPE). Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes.

Of course, the spunbond layers 146A and 146C of the first material 200 are by no means limited to ethylene polymers. For instance, propylene polymers may also be suitable for use as a semi-crystalline polyolefin. Suitable propylene polymers may include, for instance, polypropylene homopolymers, as well as copolymers or terpolymers of propylene with an α-olefin (e.g., $C_3$-$C_{20}$) comonomer, such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some embodiments from about 1 wt. % to about 20 wt. %, in some embodiments, from about 2 wt. % to about 15 wt. %, and in some embodiments from about 3 wt. % to about 10 wt. %. The density of the polypropylene (e.g., propylene/α-olefin copolymer) may be 0.95 grams per cubic centimeter (g/cm$^3$) or less, in some embodiments, from 0.85 to 0.92 g/cm$^3$, and in some embodiments, from 0.85 g/cm$^3$ to 0.91 g/cm$^3$. In one particular embodiment, the spunbond layers 146A and 146C can each include a copolymer of polypropylene and polyethylene. The polypropylene can have a refractive index ranging from about 1.44 to about 1.54, such as from about 1.46 to about 1.52, such as from about 1.48 to about 1.50, such as about 1.49, while the polyethylene can have a refractive index ranging from about 1.46 to about 1.56, such as from about 1.48 to about 1.54, such as from about 1.50 to about 1.52, such as about 1.51, to impart the material 200 with the desired light scattering and light absorbing properties.

Suitable propylene polymers are commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques may generally be employed to form the polyolefins. For instance, olefin polymers may be formed using a free radical or a coordination catalyst (e.g., Ziegler-Natta or metallocene). Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obiieski et al.; U.S. Pat. No. 5,272,236 to Lai et al.; and U.S. Pat. No. 6,090,325 to Wheat, et al., which are incorporated herein in their entirety by reference thereto for all purposes.

The melt flow index (MI) of the polyolefins may generally vary, but is typically in the range of about 0.1 grams per 10 minutes to about 100 grams per 10 minutes, in some embodiments from about 0.5 grams per 10 minutes to about 30 grams per 10 minutes, and in some embodiments, about 1 to about 10 grams per 10 minutes, determined at 190° C. The melt flow index is the weight of the polymer (in grams) that may be forced through an extrusion rheometer orifice (0.0825-inch diameter) when subjected to a force of 2160 grams in 10 minutes at 190° C., and may be determined in accordance with ASTM Test Method D1238-E.

In addition to a polyolefin, the spunbond layers 146A and 146C can each include a slip additive to enhance the softness of the spunbond layers 146A and 146C. The slip additive can also reduce the glare of the first material 200 in the operating room by reducing the light reflectance of the first material and can also render the first material 200 more opaque than the standard gown material when contacted with fats and lipids during surgery, where the standard gown material turns transparent upon contact with fats and lipids, which can result in the wearer having some concern that the barrier properties of a standard gown have been compromised.

Variants of fatty acids can be used as slip additives. For example, the slip additive can be erucamide, oleamide, stearamide, behenamide, oleyl palmitamide, stearyl erucamide, ethylene bis-oleamide, N,N'-Ethylene Bis(Stearamide) (EBS), or a combination thereof. Further, the slip additive have a refractive index ranging from about 1.42 to about 1.52, such as from about 1.44 to about 1.50, such as from about 1.46 to about 1.48, such as about 1.47, to impart the material 200 with the desired light scattering and light absorbing properties by reducing the refractive index. The slip additive can be present in each of the first spunbond layer 146A and the second spunbond layer 146C in an amount ranging from about 0.25 wt. % to about 6 wt. %, such as from about 0.5 wt. % to about 5 wt. %, such as from about 1 wt. % to about 4 wt. % based on the total weight of the particular spunbond layer 146A or 146C. In one particular embodiment, the slip additive can be present in an amount of about 2 wt. % based on the total weight of the particular spunbond layer 146A or 146C.

In addition to the polyolefin and slip additive, the spunbond layers 146A and 146C can also include one or more pigments to help achieve the desired gray color of the gown 100. Examples of suitable pigments include, but are not limited to, titanium dioxide (e.g., SCC 11692 concentrated titanium dioxide), zeolites, kaolin, mica, carbon black, calcium oxide, magnesium oxide, aluminum hydroxide, and combinations thereof. In certain cases, for instance, each of the spunbond layers 146A or 146C can include titanium dioxide in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the particular spunbond layer 146A or spunbond layer 146C. The titanium dioxide can have a refractive index ranging from about 2.2 to about 3.2, such as from about 2.4 to about 3, such as from about 2.6 to about 2.8, such as about 2.76, to impart the material 200 with the desired light scattering and light absorbing properties. Further, each of the spunbond layers 146A or 146C can also include carbon black in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the particular spunbond layer 146A or spunbond layer 146C. The carbon black can have a refractive index ranging from about 1.2 to about 2.4, such as from about 1.4 to about 2.2, such as from about 1.6 to about 2 to impart the material 200 with the desired light scattering and light absorbing properties. In addition, each of the spunbond layers 146A or 146C can also include a blue pigment in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the individual layer. The combination of the carbon black and blue pigment improves the ability of the spunbond layers 146A or 146C to absorb light.

The meltblown layer 146B of the spunbond-meltblown-spunbond second material 300 can also be formed from any of the semi-crystalline polyolefins discussed above with respect to the first spunbond layer 146A and the second spunbond layer 146C of the first material 200. In one particular embodiment, the meltblown layer 146B can be formed from 100% polypropylene.

Regardless of the specific polymer or polymers and additives used to form the SMS laminate 146, the SMS laminate 146 can have a basis weight ranging from about 5 gsm to about 50 gsm, such as from about 10 gsm to about 40 gsm, such as from about 15 gsm to about 30 gsm. In one particular embodiment, the SMS laminate 146 can have a basis weight of about 22 gsm (about 0.65 osy).

II. First and Second Rear Panels and Rear Fastening Means

Despite the use of a front panel 102 and sleeves 104 that are formed from a moisture-vapor breathable first material 200, the amount of heat that becomes trapped can be uncomfortable to the wearer. As such, the present inventor has discovered that the placement of highly breathable and air permeable first rear panel 120 and second rear panel 120 formed from a second material 300 in the rear 160 of the gown 100 that overlap when the gown 100 is secured with, for instance, hook and loop fastening means 168, can facilitate the dissipation of trapped humidity and heat between the gown 100 and the wearer. In one particular embodiment, the second material 300 can be in the form of a spunbond-meltblown-spunbond (SMS) laminate that has enhanced air breathability in order to facilitate removal of trapped heated air and moisture from the gown 100. For instance, the second material 300 allows for an air volumetric flow rate ranging from about 20 standard cubic feet per minute (scfm) to about 80 scfm, such as from about 30 scfm to about 70 scfm, such as from about 40 scfm to about 60 scfm, as determined at 1 atm (14.7 psi) and 20° C. (68° F.). In one particular embodiment, the second material 300 allows for an air volumetric flow rate of about 45 scfm. Because the first rear panel 120 and the second rear panel 122 can be formed from the air breathable second material 300, the heat and humidity that can build up inside the space between the gown 100 and the wearer's body can escape via convection and/or by movement of air as the movement of the gown materials 200 and 300 changes the volume of space between the gown 100 and the wearer's body. Further, the SMS laminate used to form the second material 300 can have a basis weight ranging from about 20 gsm to about 80 gsm, such as from about 25 gsm to about 70 gsm, such as from about 30 gsm to about 60 gsm. In one particular embodiment, the second material 300 can have a basis weight of about 40 gsm (about 1.2 osy).

In addition to the first rear panel 120 and the second rear panel 122, the rear fastening means (ties) 118 can also be formed from the second material 300. The various layers of the second material 300 are discussed in more detail below.

A. First and Second Spunbond Layers

The first spunbond layer 148 and second spunbond layer 152 of the second material 300 can be formed from any suitable polymer that provides softness and air breathability to the second material 300. For instance, the first spunbond layer 148 and the second spunbond layer 152 can be formed from a semi-crystalline polyolefin. Exemplary polyolefins may include, for instance, polyethylene, polypropylene, blends and copolymers thereof. In one particular embodiment, a polyethylene is employed that is a copolymer of ethylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin co-monomers are 1-butene, 1-hexene and 1-octene. The ethylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

The density of the polyethylene may vary depending on the type of polymer employed, but generally ranges from 0.85 to 0.96 grams per cubic centimeter ("g/cm$^3$"). Polyethylene "plastomers", for instance, may have a density in the range of from 0.85 to 0.91 g/cm$^3$. Likewise, "linear low density polyethylene" ("LLDPE") may have a density in the range of from 0.91 to 0.940 g/cm$^3$; "low density polyethylene" ("LDPE") may have a density in the range of from 0.910 to 0.940 g/cm$^3$; and "high density polyethylene" ("HDPE") may have density in the range of from 0.940 to 0.960 g/cm$^3$. Densities may be measured in accordance with ASTM 1505. Particularly suitable ethylene-based polymers for use in the present invention may be available under the designation EXACT™ from ExxonMobil Chemical Company of Houston, Tex. Other suitable polyethylene plastomers are available under the designation ENGAGE™ and AFFINITY™ from Dow Chemical Company of Midland, Mich. Still other suitable ethylene polymers are available from The Dow Chemical Company under the designations DOWLEX™ (LLDPE) and ATTANE™ (ULDPE). Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai et al.; and U.S. Pat. No. 5,278,272 to Lai, et al., which are incorporated herein in their entirety by reference thereto for all purposes.

Of course, the first spunbond layer 148 and the second spunbond layer 152 of the second material 300 are by no means limited to ethylene polymers. For instance, propylene polymers may also be suitable for use as a semi-crystalline polyolefin. Suitable propylene polymers may include, for instance, polypropylene homopolymers, as well as copolymers or terpolymers of propylene with an α-olefin (e.g., $C_3$-$C_{20}$) comonomer, such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some embodiments from about 1 wt. % to about 20 wt. %, in some embodiments, from about 2 wt. % to about 15 wt. %, and in some embodiments from about 3 wt. % to about 10 wt. %. The density of the polypropylene (e.g., propylene/α-olefin copolymer) may be 0.95 grams per cubic centimeter (g/cm$^3$) or less, in some embodiments, from 0.85 to 0.92 g/cm$^3$, and in some embodiments, from 0.85 g/cm$^3$ to 0.91 g/cm$^3$. In one particular embodiment, the spunbond layers 148 and 152 can each include a copolymer of polypropylene and polyethylene. The polypropylene can have a refractive index ranging from about 1.44 to about 1.54, such as from about 1.46 to about 1.52, such as from about 1.48 to about 1.50, such as about 1.49, while the polyethylene can have a refractive index ranging from about 1.46 to about 1.56, such as from about 1.48 to about 1.54, such as from about 1.50 to about 1.52, such as about 1.51, to impart the material 300 with the desired light scattering and light absorbing properties.

Suitable propylene polymers are commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques may generally be employed to form the polyolefins. For instance, olefin polymers may be formed using a free radical or a coordination catalyst (e.g., Ziegler-Natta or metallocene). Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al., which are incorporated herein in their entirety by reference thereto for all purposes.

The melt flow index (MI) of the polyolefins may generally vary, but is typically in the range of about 0.1 grams per 10 minutes to about 100 grams per 10 minutes, in some embodiments from about 0.5 grams per 10 minutes to about 30 grams per 10 minutes, and in some embodiments, about 1 to about 10 grams per 10 minutes, determined at 190° C. The melt flow index is the weight of the polymer (in grams) that may be forced through an extrusion rheometer orifice (0.0825-inch diameter) when subjected to a force of 2160 grams in 10 minutes at 190° C., and may be determined in accordance with ASTM Test Method D1238-E.

In addition to a polyolefin, the first spunbond layer 148 and the second spunbond layer 152 can also include a slip additive to enhance the softness of the first spunbond layer 148 and the second spunbond layer 152. The slip additive can also reduce the coefficient of friction and increase the hydrohead of the first spunbond layer 148 and the second spunbond layer 152 of the first rear panel 120 and second rear panel 122. Such a reduction in the coefficient of friction lessens the chance of the gown 100 being cut or damaged due to abrasions and also prevents fluids from seeping through the second material 300. Instead, at least in part due to the inclusion of the slip additive, fluid that contacts the outer-facing surface 302 of the gown 100 can remain in droplet form and run vertically to the distal end 156 of the gown 100 and onto the floor. The slip additive can also reduce the glare of the second material 300 in the operating room by reducing the light reflectance of the first material and can also render the second material 300 more opaque than the standard gown material when contacted with fats and lipids during surgery, where the standard gown material turns transparent upon contact with fats and lipids, which can result in the wearer having some concern that the barrier properties of a standard gown have been compromised.

The slip additive can function by migrating to the surface of the polymer used to form the first spunbond layer 148 and/or the second spunbond layer 152, where it can provide a coating that reduces the coefficient of friction of the outer-facing surface 302 and/or body-facing surface or inner-facing surface 304 of the first material 300. Variants of fatty acids can be used as slip additives. For example, the slip additive can be erucamide, oleamide, stearamide, behenamide, oleyl palmitamide, stearyl erucamide, ethylene bisoleamide, N,N'-Ethylene Bis(Stearamide) (EBS), or a combination thereof. Further, the slip additive have a refractive index ranging from about 1.42 to about 1.52, such as from about 1.44 to about 1.50, such as from about 1.46 to about 1.48, such as about 1.47, to impart the material 200 with the desired light scattering and light absorbing properties. The slip additive can be present in the first spunbond layer 148 and/or the second spunbond layer 152 of the second material 300 in an amount ranging from about 0.25 wt. % to about 6 wt. %, such as from about 0.5 wt. % to about 5 wt. %, such as from about 1 wt. % to about 4 wt. % based on the total weight of the first spunbond layer 148 and/or the second spunbond layer 152. In one particular embodiment, the slip additive can be present in an amount of about 2 wt. % based on the total weight of the first spunbond layer 148 and/or the second spunbond layer 152.

In addition to the polyolefin and slip additive, the spunbond layers 148 and 152 can also include one or more pigments to help achieve the desired gray color of the gown 100. Examples of suitable pigments include, but are not limited to, titanium dioxide (e.g., SCC 11692 concentrated titanium dioxide), zeolites, kaolin, mica, carbon black, calcium oxide, magnesium oxide, aluminum hydroxide, and combinations thereof. In certain cases, for instance, each of the spunbond layers 148 or 152 can include titanium dioxide in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the particular spunbond layer 148 or 152. The titanium dioxide can have a refractive index ranging from about 2.2 to about 3.2, such as from about 2.4 to about 3, such as from about 2.6 to about 2.8, such as about 2.76, to impart the material 200 with the desired light scattering and light absorbing properties. Further, each of the spunbond layers 148 or 152 can also include carbon black in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the particular spunbond layer 148 or spunbond layer 152. The carbon black can have a refractive index ranging from about 1.2 to about 2.4, such as from about 1.4 to about 2.2, such as from about 1.6 to about 2 to impart the material 300 with the desired light scattering and light absorbing properties. In addition, each of the spunbond layers 148 or 152 can also include a blue pigment in an amount ranging from about 0.1 wt. % to about 10 wt. %, in some embodiments, from about 0.5 wt. % to about 7.5 wt. %, and in some embodiments, from about 1 wt. % to about 5 wt. % based on the total weight of the individual layer. The combination of the carbon black and blue pigment improves the ability of the spunbond layers 148 or 152 to absorb light.

B. Meltblown Layer

The meltblown layer 150 of the spunbond-meltblown-spunbond second material 300 can also be formed from any of the semi-crystalline polyolefins discussed above with respect to the first spunbond layer 148 and the second spunbond layer 152 of the second material 300. In one particular embodiment, the meltblown layer 150 can be formed from 100% polypropylene.

III. Collar and Cuffs

The collar 110 and the cuffs 106 of the gown 100 of the present invention can be formed from a woven or knit material that is air breathable, soft, and extensible. The collar 110 can also be water repellant. In one particular embodiment, the collar 110 and the cuffs 104 can be formed from a knit polyester. Because the material from which the collar 110 is formed is extensible, the collar 110 can stretch and conform to a wearer's particular neck dimensions to lay flat against the wearer's neck and prevent any gapping of the collar 110, which could allow bone fragments, blood splatter, and other biologic materials to come into contact with the wearer. Further, as mentioned above, at the rear 160 of the gown 100, the collar 110 can have a tapered section 140 to allow for easy gown removal and to prevent the hook material 136 and loop material 138 of the hook and loop rear fastening means 168 from interfering with the collar 110. For instance, since the collar 110 is stretchable, any interference between the hook and loop rear fastening means 168 and the collar 110, such as would be the case if the collar 110 were not tapered to have a smaller width W2 and instead had a width W1 at the second end 130 of the first portion 126 of the collar 110 and at the second end 132 of the second portion 128 of the collar 110 (see FIG. 5), would lead to difficulty in removing the gown 100. This is because the collar 110 would continue stretching as it was being pulled, making disengagement from the hook and loop rear fastening means 168 cumbersome. The aforementioned tapering also helps prevent the hook and loop rear fastening means 168 from becoming caught in a bouffant cap. In an event, the collar 110 can be sewn to the front panel 102, sleeves 104, first rear panel 120, and second rear panel 122 with a polyester thread. Further, the cuffs 106 can be formed from the same material as the collar 110, as discussed above. In addition, the cuffs 106 can be sewn to the sleeves 104 with a polyester thread.

The present invention may be better understood with reference to the following examples.

Example 1

In Example 1, the opacity (diffuse reflectance), scattering power, scattering coefficient, absorption power, absorption coefficient, and transmittance were determined for the elastic film nonwoven laminate of the present invention according to a standard TAPPI test method for paper using C-illuminant as the light source, which is similar to light sources used in hospital operating rooms. The same properties were also determined for three commercially available materials used in disposable surgical gowns. The basis weight for the materials was also determined. The results are summarized in Table 1 below:

TABLE 1

Gown Material Properties

| Test | Material of Present Invention | Micro-cool | Aero Blue | Prevention Plus | Smart-Gown |
|---|---|---|---|---|---|
| Opacity (Diffuse Reflectance Using C-illuminant) (%) | 99.2 | 97.9 | 97.3 | 89.7 | 87.1 |
| Scattering Power | 2.16 | 2.74 | 1.34 | 0.701 | 1.12 |
| Scattering Coefficient ($m^2/g$) | 32.0 | 41.3 | 24.0 | 11.5 | 16.2 |
| Absorption Power | 1.05 | 0.515 | 0.869 | 0.603 | 0.327 |
| Absorption Coefficient ($m^2/g$) | 15.5 | 7.77 | 15.6 | 9.89 | 4.71 |
| Transmittance | 0.081 | 0.124 | 0.157 | 0.326 | 0.344 |
| Basis Weight (gsm) | 67.5 | 66.3 | 55.8 | 61.0 | 69.4 |

As shown above, the material used in the disposable surgical gown of the present invention has a lower transmittance and higher opacity than the other four materials.

The present invention has been described both in general and in detail by way of examples. These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A laminate material comprising:
   a liquid impervious, moisture vapor breathable elastic film positioned between a first material and a second material,
   wherein the first material comprises a nonwoven layer and the second material comprises a spunbond-meltblown-spunbond laminate,
   wherein the elastic film, first material, and second material each include a carbon black pigment and titanium dioxide, wherein carbon black pigment and titanium dioxide are included in at least one spunbond layer of the second material,
   wherein the elastic film further includes a fluorochemical additive,
   wherein the first material and the second material further include a slip additive, and
   wherein the laminate material exhibits an opacity of greater than about 98% and a light transmittance of less than about 0.1.

2. The laminate material of claim 1, wherein the elastic film further includes a calcium carbonate filler, wherein the calcium carbonate filler is present in a core layer of the elastic film in an amount ranging from about 0.1 wt. % to about 5 wt. % based on the total weight of the core layer.

3. The laminate material of claim 1, wherein the fluorochemical additive is present in a core layer of the elastic film in an amount ranging from about 50 wt. % to about 85 wt. % based on the total weight of the core layer.

4. The laminate material of claim 1, wherein the slip additive comprises erucamide, oleamide, stearamide, behenamide, oleyl palmitamide, stearyl erucamide, ethylene bis-oleamide, N,N'-Ethylene Bis(Stearamide) (EBS), or a combination thereof, wherein the slip additive is present in the first material in an amount ranging from about 0.25 wt. % to about 6 wt. % based on the total weight of the first material, further wherein the slip additive is present in the second material in an amount ranging from about 0.25 wt. % to about 6 wt. % based on the total weight of each spunbond layer in the second material.

5. The laminate material of claim 1, wherein the first material includes a spunbond layer.

6. The laminate material of claim 1, wherein the first material and each spunbond layer in the second material comprise a copolymer of propylene and ethylene, wherein the ethylene is present in an amount ranging from about 1 wt. % to about 20 wt. %.

7. The laminate material of claim 1, wherein the meltblown layer in the second material comprises polypropylene.

8. The laminate material of claim 1, wherein the core layer of the elastic film comprises propylene.

9. The laminate material of claim 1, wherein the elastic film comprises a first skin layer and a second skin layer disposed on opposite sides of the core layer, wherein the first skin layer and the second skin layer each comprise a copolymer of propylene and ethylene, wherein the ethylene is present in an amount ranging from about 1 wt. % to about 20 wt. %.

10. The laminate material of claim 1, wherein the elastic film has a basis weight ranging from about 5 gsm to about 50 gsm.

11. The laminate material of claim 1, wherein the nonwoven layer has a basis weight ranging from about 5 gsm to about 50 gsm and the spunbond-meltblown-spunbond laminate has a basis weight ranging from about 10 gsm to about 60 gsm.

12. The laminate material of claim 1, wherein the elastic film meets the requirements of ASTM-1671.

* * * * *